United States Patent
Kikuchi

(10) Patent No.: US 10,676,644 B2
(45) Date of Patent: Jun. 9, 2020

(54) MOULDED BODY

(71) Applicant: DAICEL CORPORATION, Osaka-shi, Osaka (JP)

(72) Inventor: Shinji Kikuchi, Himeji (JP)

(73) Assignee: DAICEL CORPORATION, Osaka-Shi (JP)

(*) Notice: Subject to any disclaimer, the term of this patent is extended or adjusted under 35 U.S.C. 154(b) by 0 days.

(21) Appl. No.: 15/736,914

(22) PCT Filed: Jun. 1, 2016

(86) PCT No.: PCT/JP2016/066256
§ 371 (c)(1),
(2) Date: Dec. 15, 2017

(87) PCT Pub. No.: WO2016/203958
PCT Pub. Date: Dec. 22, 2016

(65) Prior Publication Data
US 2018/0362803 A1    Dec. 20, 2018

(30) Foreign Application Priority Data
Jun. 17, 2015 (JP) ................. 2015-122342

(51) Int. Cl.
*C09D 183/06*    (2006.01)
*C09D 7/47*    (2018.01)
(Continued)

(52) U.S. Cl.
CPC ............. *C09D 183/06* (2013.01); *B32B 1/00* (2013.01); *B32B 27/00* (2013.01); *C08G 59/02* (2013.01);
(Continued)

(58) Field of Classification Search
CPC .... C08G 59/02; C08G 59/3281; C08G 59/38; C09D 163/00; C09D 183/06; C09D 7/47; C08J 2367/02; C08J 2483/06; C08J 7/047
See application file for complete search history.

(56) References Cited

U.S. PATENT DOCUMENTS 6,132,882 A    10/2000 Landin et al.
8,987,344 B2    3/2015 Nakayama et al.
(Continued)

FOREIGN PATENT DOCUMENTS

CN    101974227 A * 2/2011
JP    2008-248170 A 10/2008
(Continued)

OTHER PUBLICATIONS

PCI (BYK(R)-3350 Awarded the BYK Advance Innovation Price) (Year: 2010).*
(Continued)

*Primary Examiner* — Alicia J Sawdon
(74) *Attorney, Agent, or Firm* — Birch, Stewart, Kolasch & Birch, LLP

(57) ABSTRACT

Provided is a shaped article including a hardcoat layer, where the hardcoat layer has surface hardness, flexibility, and heat resistance at high levels and offers excellent workability. The shaped article according to the present invention is a shaped article including a hardcoat layer, a substrate layer, and a thermoplastic resin layer and having a curved shape. The hardcoat layer defines an outermost surface of the shaped article. The hardcoat layer includes a cure product of a curable composition. The curable composition includes a cationically curable silicone resin and a leveling agent. The cationically curable silicone resin includes a silsesquioxane unit. The cationically curable silicone resin includes an epoxy-containing monomeric unit in a proportion of 50 mole percent or more of the totality of all (Continued)

monomeric units and has a number-average molecular weight of 1000 to 3000.

13 Claims, 1 Drawing Sheet

(51) Int. Cl.
| | |
|---|---|
| B32B 27/00 | (2006.01) |
| B32B 1/00 | (2006.01) |
| C08G 59/38 | (2006.01) |
| C09D 163/00 | (2006.01) |
| C08G 59/32 | (2006.01) |
| C08G 59/02 | (2006.01) |
| C08G 77/04 | (2006.01) |
| C08G 77/14 | (2006.01) |
| C08J 7/04 | (2020.01) |
| B29K 83/00 | (2006.01) |
| B29C 51/10 | (2006.01) |
| B29C 51/14 | (2006.01) |
| B29K 33/00 | (2006.01) |

(52) U.S. Cl.
CPC ......... *C08G 59/3281* (2013.01); *C08G 59/38* (2013.01); *C08G 77/045* (2013.01); *C08G 77/14* (2013.01); *C08J 7/047* (2013.01); *C09D 7/47* (2018.01); *C09D 163/00* (2013.01); *B29C 51/10* (2013.01); *B29C 51/14* (2013.01); *B29K 2033/12* (2013.01); *B29K 2083/00* (2013.01); *B29K 2905/02* (2013.01); *C08J 2367/02* (2013.01); *C08J 2483/06* (2013.01)

(56) References Cited

U.S. PATENT DOCUMENTS

| | | | |
|---|---|---|---|
| 9,233,495 B2 | 1/2016 | Kim et al. | |
| 2006/0006541 A1* | 1/2006 | Tsuchiya | C09D 183/04 257/759 |
| 2009/0130157 A1* | 5/2009 | Ylitalo | A01N 25/34 424/405 |
| 2010/0029804 A1* | 2/2010 | Nakayama | C08G 18/3876 522/172 |
| 2011/0196059 A1* | 8/2011 | Nagai | C07F 7/21 522/172 |
| 2012/0168074 A1 | 7/2012 | Kim et al. | |
| 2012/0219802 A1 | 8/2012 | Hilgers et al. | |
| 2013/0331476 A1* | 12/2013 | Bae | C09D 183/06 522/148 |
| 2015/0093585 A1 | 4/2015 | Bae et al. | |
| 2015/0159044 A1* | 6/2015 | Bae | C09D 183/06 523/435 |
| 2015/0275043 A1* | 10/2015 | Kikuchi | C09D 183/04 428/220 |
| 2016/0297933 A1 | 10/2016 | Kuwana et al. | |

FOREIGN PATENT DOCUMENTS

| | | |
|---|---|---|
| JP | 2009-279840 A | 12/2009 |
| JP | 2010-515778 A | 5/2010 |
| JP | 2012-241118 A | 12/2012 |
| JP | 2013-516340 A | 5/2013 |
| JP | 2014-065172 A | 4/2014 |
| JP | 2015-107448 A | 10/2015 |
| JP | 2015-193747 A | 11/2015 |
| JP | 2015-212353 A | 11/2015 |

OTHER PUBLICATIONS

Non-Final Office Action dated May 2, 2019, in U.S. Appl. No. 15/736,383.
International Search Report issued in PCT/JP2016/066256 (PCT/ISA/210), dated Sep. 6, 2016.
Written Opinion of the International Searching Authority issued in PCT/JP2016/066256 (PCT/ISA/237), dated Sep. 6, 2016.
U.S. Appl. No. 15/736,383, filed Dec. 14, 2017, Unassigned.
U.S. Appl. No. 15/736,926, filed Dec. 15, 2017, Unassigned.
U.S. Office Action, dated Jul. 11, 2019, for copending U.S. Appl. No. 15/736,926.
Chinese Office Action and Search Report, dated Aug. 2, 2019, for Chinese Application No. 201680035125.5, with an English translation.
Zhao, "Synthesis and Esterification Study of γ-Glycidyl Ether Propoxy POSS", The Department of Graduate Students of Anhui University of Science and Technology, Jun. 7, 2014, 13 pages.
English translation of International Preliminary Report on patentability and Written Opinion dated Dec. 28, 2017, in PCT International Application No. PCT/JP2016/066256.
International Preliminary Report on Patentability and Written Opinion dated Aug. 16, 2016, in PCT International Application No. PCT/JP2016/066255, with English translation dated Dec. 28, 2017.
International Preliminary Report on Patentability and Written Opinion dated Sep. 6, 2016, in PCT International Application No. PCT/JP2016/066257, with English translation dated Dec. 28, 2017.
International Search Report dated Aug. 16, 2016, in PCT International Application No. PCT/JP2016/066255, with English translation.
International Search Report dated Sep. 6, 2016, in PCT International Application No. PCT/JP2016/066257, with English translation.

\* cited by examiner

[FIG. 1]
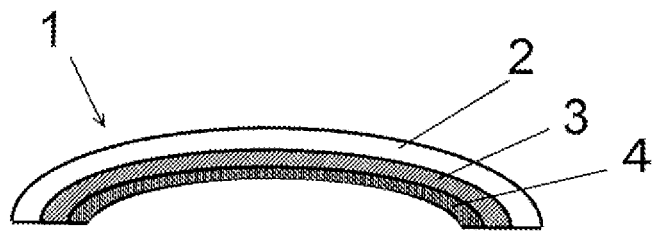
[FIG. 2]
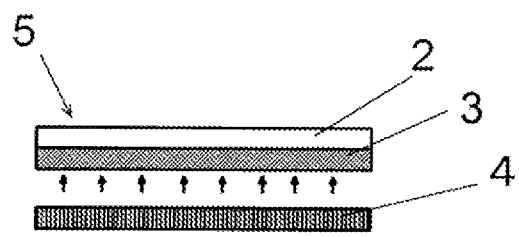
(B-1)
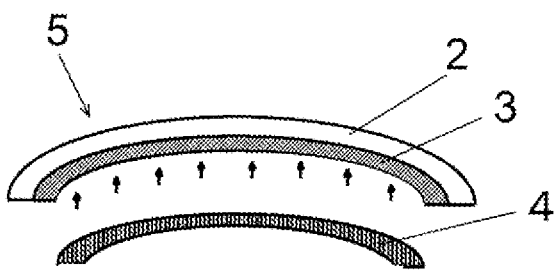
(B-2)

MOULDED BODY

TECHNICAL FIELD

The present invention relates to a shaped article including a hardcoat layer, a substrate layer, and a thermoplastic resin layer and having a curved shape. This hardcoat layer excels in properties such as surface hardness and flexibility. The shaped article has the hardcoat layer as an outermost surface layer and is usable typically as glass alternatives for hardcoat films. This application claims priority to Japanese Patent Application No. 2015-122342, filed on Jun. 17, 2015 to Japan, the entire contents of which are incorporated herein by reference.

BACKGROUND ART

There have been circulated hardcoat films each including a substrate (base) and, on one or both sides of the substrate, a hardcoat layer having a surface pencil hardness of about 3H. The hardcoat layers in the hardcoat films are formed from materials selected mainly from UV-curable acrylic monomers (see, for example, Patent Literature (PTL) 1). For higher surface pencil hardness of the hardcoat layers, some hardcoat layers further include nanoparticles.

In contrast, glass is known as a material having extremely high surface hardness. Among such glass, there is known glass that has been subjected to an alkali ion exchange treatment and has a higher surface pencil hardness of up to 9H. Such glass, however, has poor flexibility and workability, is to be produced and processed not by a roll-to-roll process, but by a sheet-to-sheet process. This leads to high production cost.

CITATION LIST

Patent Literature

PTL 1: Japanese Unexamined Patent Application Publication (JP-A) No. 2009-279840

SUMMARY OF INVENTION

Technical Problem

However, the hardcoat films and other shaped articles prepared using UV-curable acrylic monomers are not yet considered to have sufficient surface hardness. In general, exemplary possible solutions to offer higher hardness include the use of multifunctional UV-curable acrylic monomers as the UV-curable acrylic monomers; and the designing of the hardcoat layers to have larger thicknesses. Disadvantageously, however, these techniques cause the hardcoat layers to undergo greater cure shrinkage and consequently cause the hardcoat films to suffer from curling and/or cracking. Also disadvantageously, the hardcoat layers further including nanoparticles may haze (whiten) due to aggregation of the nanoparticles, when the nanoparticles have poor compatibility with the UV-curable acrylic monomers.

In contrast, the alkali ion exchange treatment of the glass disadvantageously yields a large amount of alkaline wastewater and puts a heavy load on the environment. Further disadvantageously, such glass is heavy and fragile, and costs much. Under these circumstances, demands have been made to provide organic materials that offer bendability (flexibility) and workability at excellent levels and still have high surface hardness.

In addition, the hardcoat layers are required to have not only high surface hardness as described above, but also, in particular, excellent heat resistance, because the hardcoat films and other shaped articles have been applied to wider and wider uses in recent years. The hardcoat layers prepared using UV-curable acrylic monomers, however, are not considered to be sufficient also in this view of heat resistance.

Accordingly, the present invention has an object to provide a shaped article including a hardcoat layer that has surface hardness, flexibility, and heat resistance at high levels and offers excellent workability.

Solution to Problem

The inventor of the present invention found that a cured product of a specific curable composition, when used as a hardcoat layer of a shaped article, allows the shaped article to have flexibility and surface hardness at better levels, where the curable composition includes a specific cationically curable silicone resin in combination with a leveling agent. The present invention has been made on the basis of these findings.

Specifically, the present invention provides a shaped article including a hardcoat layer, a substrate layer, and a thermoplastic resin layer. The shaped article has a curved shape. The hardcoat layer defines an outermost surface of the shaped article. The hardcoat layer includes (is made of) a cured product of a curable composition. The curable composition includes a cationically curable silicone resin and a leveling agent. The cationically curable silicone resin includes a silsesquioxane unit. The cationically curable silicone resin includes an epoxy-containing monomeric unit in a proportion of 50 mole percent or more of the totality of all monomeric units. The cationically curable silicone resin has a number-average molecular weight of 1000 to 3000.

In the shaped article, the cationically curable silicone resin may include a constitutional unit represented by Formula (1) as the silsesquioxane unit, and the cationically curable silicone resin may include the constitutional unit represented by Formula (1) in a proportion of 50 mole percent or more of the totality (100 mole percent) of all siloxane constitutional units. Formula (1) is expressed as follows:

[Chem. 1]

$$[R^1SiO_{3/2}] \quad (1)$$

wherein $R^1$ is selected from an epoxy-containing group, hydrogen, and a hydrocarbon group.

In the shaped article, the cationically curable silicone resin may further include a constitutional unit represented by Formula (2) as the silsesquioxane unit. The cationically curable silicone resin may have a mole ratio of the constitutional unit represented by Formula (1) to the constitutional unit represented by Formula (2) of 5 or more. Formula (2) is expressed as follows:

[Chem. 2]

$$[R^1SiO_{2/2}(OR^2)] \quad (2)$$

wherein $R^1$ is as defined in Formula (1); and $R^2$ is selected from hydrogen and $C_1$-$C_4$ alkyl.

In the shaped article, the cationically curable silicone resin may have a total proportion (totality) of the constitutional unit represented by Formula (1) and the constitutional unit represented by Formula (2) of 55 to 100 mole percent of the totality (100 mole percent) of all siloxane constitutional units.

In the shaped article, the cationically curable silicone resin may have a molecular-weight dispersity (weight-average molecular weight to number-average molecular weight ratio) of 1.0 to 3.0.

In the shaped article, $R^1$ in Formula (1) may include at least one of groups represented by Formulae (1a) to (1d):

[Chem. 3]

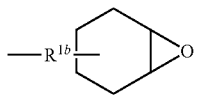
(1a)

wherein $R^{1a}$ represents linear or branched alkylene,

[Chem. 4]

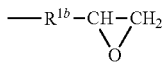
(1b)

wherein $R^{1b}$ represents linear or branched alkylene,

[Chem. 5]

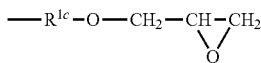
(1c)

wherein $R^{1c}$ represents linear or branched alkylene,

[Chem. 6]

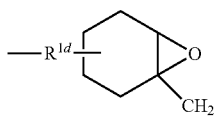
(1d)

wherein $R^{1d}$ represents linear or branched alkylene.

In the shaped article, the leveling agent may be at least one of a silicone leveling agent and a fluorine leveling agent and may contain at least one of an epoxy-reactive group (group that is reactive with an epoxy group) and a hydrolytically condensable group.

In the shaped article, the curable composition may include the leveling agent in a proportion of 0.01 to 10 parts by weight per 100 parts by weight of the cationically curable silicone resin.

In the shaped article, the leveling agent may be a hydroxy-containing silicone leveling agent, and the curable composition may include the leveling agent in a proportion of 0.01 to 5 parts by weight per 100 parts by weight of the cationically curable silicone resin.

The shaped article may further include a curing catalyst.

In the shaped article, the curing catalyst may be a cationic photoinitiator.

In the shaped article, the curing catalyst may be a cationic thermal initiator.

In the shaped article, the curable composition may be a curable composition for hardcoat layer formation.

In the shaped article, the hardcoat layer may have a thickness of 0.1 to 200 μm.

The shaped article may be produced through a roll-to-roll process.

Specifically, the present invention relates to the following:

(1) A shaped article including a hardcoat layer, a substrate layer, and a thermoplastic resin layer, the shaped article having a curved shape, the hardcoat layer defining an outermost surface of the shaped article, the hardcoat layer including a cured product of a curable composition, the curable composition including a cationically curable silicone resin and a leveling agent, the cationically curable silicone resin including a silsesquioxane unit, the cationically curable silicone resin including an epoxy-containing monomeric unit in a proportion of 50 mole percent or more of the totality of all monomeric units, the cationically curable silicone resin having a number-average molecular weight of 1000 to 3000.

(2) The shaped article according to (1), wherein the cationically curable silicone resin includes a constitutional unit represented by Formula (1) as the silsesquioxane unit, and wherein the cationically curable silicone resin includes the constitutional unit represented by Formula (1) in a proportion of 50 mole percent or more of the totality (100 mole percent) of all siloxane constitutional units.

(3) The shaped article according to (2), wherein the cationically curable silicone resin further includes a constitutional unit represented by Formula (2) as the silsesquioxane unit, and wherein the cationically curable silicone resin has a mole ratio of the constitutional unit represented by Formula (1) to the constitutional unit represented by Formula (2) is 5 or more.

(4) The shaped article according to (3), wherein the cationically curable silicone resin has a total proportion (totality) of the constitutional unit represented by Formula (1) and the constitutional unit represented by Formula (2) of 55 to 100 mole percent of the totality (100 mole percent) of all siloxane constitutional units.

(5) The shaped article according to any one of (1) to (4), wherein the cationically curable silicone resin has a molecular-weight dispersity (weight-average molecular weight to number-average molecular weight ratio) of 1.0 to 3.0.

(6) The shaped article according to any one of (2) to (5), wherein $R^1$ in Formula (1) includes at least one of groups represented by Formulae (1a) to (1d).

(7) The shaped article according to any one of (1) to (6), wherein the leveling agent is at least one of a silicone leveling agent and a fluorine leveling agent, and wherein the leveling agent contains at least one of an epoxy-reactive group and a hydrolytically condensable group.

(8) The shaped article according to any one of (1) to (7), wherein the curable composition includes the leveling agent in a proportion of 0.01 to 10 parts by weight per 100 parts by weight of the cationically curable silicone resin.

(9) The shaped article according to any one of (1) to (8), wherein the leveling agent is a hydroxy-containing silicone leveling agent, and wherein the curable composition contains the leveling agent in a proportion of 0.01 to 5 parts by weight per 100 parts by weight of the cationically curable silicone resin.

(10) The shaped article according to any one of (1) to (9), further including a curing catalyst.

(11) The shaped article according to (10), wherein the curing catalyst is a cationic photoinitiator.

(12) The shaped article according to (10), wherein the curing catalyst is a cationic thermal initiator.

(13) The shaped article according to any one of (1) to (12), wherein the curable composition is a curable composition for hardcoat layer formation.

(14) The shaped article according to any one of (1) to (13), wherein the hardcoat layer has a thickness of 0.1 to 200 μm.

(15) The shaped article according to any one of (1) to (14), which is produced through a roll-to-roll process.

(16) The shaped article according to any one of (1) to (15), which has a thickness of 1 to 10000 μm.

(17) The shaped article according to any one of (1) to (16), wherein the hardcoat layer has a surface pencil hardness of 3H or greater.

(18) The shaped article according to any one of (1) to (17), wherein the shaped article has a bend of 30 mm or less, where the bend is evaluated in accordance with JIS K 5600-5-1 using cylindrical mandrels.

Advantageous Effects of Invention

The shaped article according to the present invention, as having the configuration, has flexibility and surface hardness at high levels and also offers heat resistance and workability at excellent levels.

BRIEF DESCRIPTION OF DRAWINGS

FIG. 1 illustrates a shaped article according to a preferred embodiment of the present invention, where the shaped article includes a hardcoat layer, a substrate layer, and a thermoplastic resin layer disposed in the specified sequence; and FIG. 2 illustrates exemplary laminating steps (B) in a method for producing shaped articles according to the present invention.

DESCRIPTION OF EMBODIMENTS

Shaped Article

A shaped article according to the present invention is hereinafter also simply referred to as "the present invention". The shaped article according to the present invention includes a hardcoat layer, a substrate layer (base layer), and a thermoplastic resin layer. The shaped article has a curved shape. The hardcoat layer defines an outermost surface of the shaped article. FIG. 1 illustrates a shaped article according to one of preferred embodiments of the present invention. This article includes the hardcoat layer, the substrate layer, and the thermoplastic resin layer disposed in the specified sequence. The shaped article according to the present invention may further include one or more layers other than the hardcoat layer, the substrate layer, and the thermoplastic resin layer. Non-limiting examples of the other layers include pressure-sensitive adhesive layers, anchoring layers, low-reflective layers, antifouling layers, water-repellent layers, oil-repellent layers, antifog layers, protective film layers, print layers, electroconductive layers, electromagnetic shielding layers, ultraviolet-absorbing layers, infrared-absorbing layers, and blue-light-blocking layers. As the curved shape, the shaped article has only to have, entirely or partially, a portion that is not flat (curved portion). The curve (curved plane) may be curved convexly or concavely toward the outermost-surface hardcoat layer, but is preferably curved convexly. The shaped article according to the present invention may be produced by an after-mentioned method for producing a shaped article. The hardcoat layer may be present partially or entirely on or over the surface of the substrate layer.

The shaped article according to the present invention has a thickness selectable as appropriate within the range of typically 1 to 10000 μm, preferably 10 to 1000 μm, more preferably 20 to 500 μm, and furthermore preferably 30 to 300 μm.

The hardcoat layer in the shaped article according to the present invention has a surface pencil hardness of typically 3H or greater, preferably 4H or greater, more preferably 6H or greater, and furthermore preferably 8H or greater. The pencil hardness may be evaluated according to the method prescribed in JIS K 5600-5-4.

The shaped article according to the present invention has a bend (flexibility) of typically 30 mm or less (e.g., 1 to 30 mm), preferably 25 mm or less, more preferably 20 mm or less, and furthermore preferably 15 mm or less. The bend (flexibility) may be evaluated using cylindrical mandrels, in accordance with JIS K 5600-5-1.

The shaped article according to the present invention has a haze of typically 1.5% or less, and preferably 1.0% or less. The lower limit of the haze is typically 0.1%. The shaped article, particularly when controlled to have a haze of 1.0% or less, tends to be suitable typically in uses that require very high transparency, such as uses as surface-protecting sheets for touch screens (touch panels) and other displays. The haze of the shaped article according to the present invention can be easily controlled within the range typically using an after-mentioned transparent substrate as the substrate. The haze may be measured in accordance with JIS K 7136.

The shaped article according to the present invention has a total luminous transmittance of typically 85% or more, and preferably 90% or more. The upper limit of the total luminous transmittance is typically 99%. The shaped article, particularly when controlled to have a total luminous transmittance of 90% or more, tends to be suitable in uses that require very high transparency, such as uses as surface-protecting sheets for touch screens and other displays. The total luminous transmittance of the shaped article according to the present invention can easily be controlled within the range typically using the transparent substrate as the substrate. The total luminous transmittance may be measured in accordance with JIS K 7361-1.

Hardcoat Layer

The hardcoat layer in the present invention includes (is made of) a cured product of an after-mentioned curable composition. The hardcoat layer is a hardcoat layer made from the curable composition (curable composition for hardcoat layer formation). In other words, the hardcoat layer is a layer of a cured product of the curable composition. The hardcoat layer can be formed from the curable composition by an after-mentioned method for producing a shaped article (hardcoat layer forming step (A)).

The hardcoat layer has a thickness of typically 0.1 to 200 μm, preferably 1 to 150 μm, more preferably 3 to 100 μm, furthermore preferably 5 to 50 μm, and particularly preferably 10 to 30 μm. In particular, the hardcoat layer, even when having a small thickness (for example, even when having a thickness of 5 μm or less), can maintain high surface hardness (for example, can maintain a pencil hardness of H or greater). Besides, the hardcoat layer can have a large thickness so as to have a significantly higher pencil hardness (for example, to have a pencil hardness of 9H or greater). This is because the hardcoat layer, even when having a large thickness (for example, even when having a thickness of 50 μm or more), resists cracking and other defects which are caused typically by cure shrinkage.

The hardcoat layer has a haze of typically 1.5% or less, and preferably 1.0% or less, at a thickness of 50 μm. The lower limit of the haze is typically 0.1%. The shaped article, particularly when having a haze of the hardcoat layer of 1.0% or less, tends to be suitable typically in uses that require very high transparency, such as uses as surface-protecting sheets for touch screens and other displays. The haze of the hardcoat layer may be measured in accordance with JIS K 7136.

The hardcoat layer has a total luminous transmittance of typically 85% or more, and preferably 90% or more, at a thickness of 50 μm. The upper limit of the total luminous transmittance is typically 99%. The shaped article, when having a total luminous transmittance of the hardcoat layer of 85% or more, tends to be suitable in uses that require very high transparency, such as uses as surface-protecting sheets for touch screens and other displays. The total luminous transmittance of the hardcoat layer may be measured in accordance with JIS K 7361-1.

In general, the hardcoat layer also has high scratch resistance and resists scratching even when being scraped on the surface typically by 100 reciprocating sliding movements of a steel wool #0000 having a diameter of 1 cm under a load of 1.3 kg/cm$^2$.

The hardcoat layer also has excellent surface smoothness and has an arithmetic mean surface roughness $R_a$ of typically 0.1 to 20 nm, preferably 0.1 to 10 nm, and more preferably 0.1 to 5 nm, as determined by a method in accordance with JIS B 0601.

The hardcoat layer also has excellent surface slip and has a surface water contact angle of typically 60° or more (e.g., 60° to 110°), preferably 70° to 110°, and more preferably 80° to 110°. The hardcoat layer, if having an excessively low water contact angle, may have lower scratch resistance, probably because of lower slip.

Curable Composition

The curable composition in the present invention includes a cationically curable silicone resin and a leveling agent. In addition to these components, the curable composition may further include one or more other components such as epoxy compounds other than the cationically curable silicone resin; and curing catalysts. Such other epoxy compounds are hereinafter also simply referred to as "epoxy compound(s)". A most preferred, but non-limiting example of the curable composition in the present invention is a curable composition including a cationically curable silicone resin, an epoxy compound, a leveling agent, and a curing catalyst. In particular, the curable composition in the present invention is featured by using a specific cationically curable silicone resin as described below.

Cationically Curable Silicone Resin

The cationically curable silicone resin includes a silsesquioxane unit as a monomeric constitutional unit, includes an epoxy-containing monomeric unit in a proportion of 50 mole percent or more of the totality of all monomeric units, and has a number-average molecular weight of 1000 to 3000. The number-average molecular weight is a value determined by gel permeation chromatography (GPC) and calibrated with a polystyrene standard.

The cationically curable silicone resin preferably includes, as the silsesquioxane unit, a constitutional unit represented by Formula (1). This constitutional unit is hereinafter also referred to as a "T3 species". Formula (1) is expressed as follows:

[Chem. 1]

$$[R^1SiO_{3/2}] \quad (1)$$

The constitutional unit represented by Formula (1) is a silsesquioxane constitutional unit generally represented by the formula: [$RSiO_{3/2}$] (a so-called T unit). R in the formula is selected from hydrogen and a monovalent organic group; hereinafter the same. The constitutional unit represented by Formula (1) results from (is formed by) hydrolysis and condensation of a corresponding hydrolyzable trifunctional silane compound (specifically, such as an after-mentioned compound represented by Formula (a)).

$R^1$ in Formula (1) is selected from an epoxy-containing group (monovalent group), hydrogen, and a hydrocarbon group (monovalent group). Non-limiting examples of the epoxy-containing group include known or common groups containing an oxirane ring, such as groups containing at least one of a glycidyl group and a cycloaliphatic epoxy group.

Non-limiting examples of the groups containing a glycidyl group include glycidyloxy-$C_1$-$C_{10}$ alkyls such as glycidyloxymethyl, 2-glycidyloxymethyl, and 3-glycidyloxymethyl, of which glycidyloxy-$C_1$-$C_4$ alkyls are typified.

Non-limiting examples of the groups containing a cycloaliphatic epoxy group include epoxy-$C_5$-$C_{12}$ cycloalkyl-linear or branched $C_1$-$C_{10}$ alkyls exemplified by epoxycyclopentyl-$C_1$-$C_{10}$ alkyls such as 2,3-epoxycyclopentylmethyl, 2-(2,3-epoxycyclopentyl)ethyl, 2-(3,4-epoxycyclopentyl)ethyl, and 3-(2,3-epoxycyclopentyl) propyl; and epoxycyclooctyl-$C_1$-$C_{10}$ alkyls such as 4,5-epoxycyclooctylmethyl, 2-(4,5-epoxycyclooctyl)ethyl, and 3-(4,5-epoxycyclooctyl) propyl.

These groups containing a cycloaliphatic epoxy group may each have, as a substituent, one or more $C_1$-$C_4$ alkyls such as methyl and ethyl on the $C_5$-$C_{12}$ cycloalkane ring. Non-limiting examples of such groups containing a substituted cycloaliphatic epoxy group include $C_1$-$C_4$ alkyl-epoxy-$C_5$-$C_{12}$ cycloalkyl-linear or branched $C_1$-$C_{10}$ alkyls such as 4-methyl-3,4-epoxycyclohexylmethyl, 2-(3-methyl-3,4-epoxycyclohexyl)ethyl, 2-(4-methyl-3,4-epoxycyclohexyl)ethyl, 3-(4-methyl-3,4-epoxycyclohexyl)propyl, and 4-(4-methyl-3,4-epoxycyclohexyl)butyl.

Of the groups containing at least one of a glycidyl group and a cycloaliphatic epoxy group, preferred are groups represented by Formulae (1a) to (1d), more preferred are the groups represented by Formula (1a) and the groups represented by Formula (1c), and furthermore preferred are the groups represented by Formula (1a). These are preferred from the viewpoints of the curability of the curable composition, and the surface hardness and heat resistance of the cured product. Formulae (1a) to (1d) are expressed as follows:

[Chem. 3]

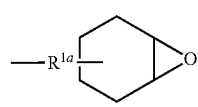

(1a)

[Chem. 4]

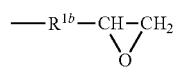

(1b)

[Chem. 5]

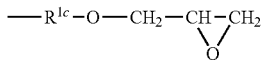
(1c)

[Chem. 6]

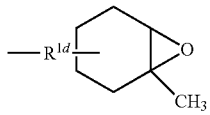
(1d)

In Formula (1a), $R^{1a}$ represents linear or branched alkylene. Non-limiting examples of the linear or branched alkylene include $C_1$-$C_{10}$ linear or branched alkylenes such as methylene, methylmethylene, dimethylmethylene, ethylene, propylene, trimethylene, tetramethylene, pentamethylene, hexamethylene, and decamethylene. In particular, $R^{1a}$ is preferably selected from $C_1$-$C_4$ linear (straight-chain) alkylenes and $C_3$ or $C_4$ branched (branched chain) alkylenes; more preferably selected from ethylene, trimethylene, and propylene, and furthermore preferably selected from ethylene and trimethylene. These groups are preferred from the viewpoint of the surface hardness and curability of the cured product.

In Formula (1b), $R^{1b}$ represents linear or branched alkylene and is exemplified by groups as with $R^{1a}$. In particular, $R^{1b}$ is preferably selected from $C_1$-$C_4$ linear alkylenes and $C_3$ or $C_4$ branched alkylenes; more preferably selected from ethylene, trimethylene, and propylene; and furthermore preferably selected from ethylene and trimethylene. These groups are preferred from the viewpoint of the surface hardness and curability of the cured product.

In Formula (1c), $R^{1c}$ represents linear or branched alkylene and is exemplified by groups as with $R^{1a}$. In particular, $R^{1c}$ is preferably selected from $C_1$-$C_4$ linear alkylenes and $C_3$ or $C_4$ branched alkylenes; more preferably selected from ethylene, trimethylene, and propylene; and furthermore preferably selected from ethylene and trimethylene. These groups are preferred from the viewpoint of the surface hardness and curability of the cured product.

In Formula (1d), $R^{1d}$ represents linear or branched alkylene and is exemplified by groups as with $R^{1a}$. In particular, $R^{1d}$ is preferably selected from $C_1$-$C_4$ linear alkylenes and $C_3$ or $C_4$ branched alkylenes; more preferably selected from ethylene, trimethylene, and propylene; and furthermore preferably ethylene and trimethylene. These groups are preferred from the viewpoint of the surface hardness and curability of the cured product.

$R^1$ in Formula (1) is particularly preferably selected from groups represented by Formula (1a) in which $R^{1a}$ is ethylene, and $R^1$ is especially preferably a 2-(3',4'-epoxycyclohexyl)ethyl group.

Non-limiting examples of the hydrocarbon group as $R^1$ in Formula (1) include alkyls, alkenyls, cycloalkyls, cycloalkenyls, aryls, and aralkyls. Non-limiting examples of the alkyls include linear or branched alkyls such as methyl, ethyl, propyl, n-butyl, isopropyl, isobutyl, s-butyl, t-butyl, and isopentyl. Non-limiting examples of the alkenyls include linear or branched alkenyls such as vinyl, allyl, and isopropenyl. Non-limiting examples of the cycloalkyls include cyclobutyl, cyclopentyl, and cyclohexyl. Non-limiting examples of the cycloalkenyls include cyclopentenyl, cyclohexenyl, and cycloheptyl. Non-limiting examples of the aryls include phenyl, tolyl, and naphthyl. Non-limiting examples of the aralkyls include benzyl and phenethyl.

These hydrocarbon groups may each have one or more substituents. The substituents may be selected typically from these hydrocarbon groups, as well as ether groups, ester groups, carbonyls, siloxane groups, halogens, (meth)acryls, mercaptos, aminos, and hydroxys.

The cationically curable silicone resin may include each of different constitutional units represented by Formula (1) alone or in combination.

In general, a complete cage (fully condensed cage) silsesquioxane includes the constitutional unit or units represented by Formula (1) ("T3 species") alone. However, the cationically curable silicone resin for use in the present invention preferably further includes a constitutional unit represented by Formula (2). The constitutional unit represented by Formula (2) is hereinafter also referred to as "T2 species". The curable composition, when including T2 species in a specific proportion relative to T3 species, allows the cured product to have higher hardness. This is probably because the resin can form a partial cage structure. Formula (2) is expressed as follows:

[Chem. 2]

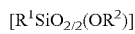
(2)

$R^1$ in Formula (2) is selected from an epoxy-containing group (monovalent group), hydrogen, and a hydrocarbon group (monovalent group), as in Formula (1). Preferred examples of the epoxy-containing group and the hydrocarbon group in Formula (2) are also as in Formula (1). $R^2$ in Formula (2) is selected from hydrogen and $C_1$-$C_4$ alkyl. Non-limiting examples of the $C_1$-$C_4$ alkyl as $R^2$ include methyl, ethyl, propyl, and butyl, of which methyl and ethyl are preferred, and methyl is particularly preferred.

The cationically curable silicone resin may have a ratio (T3 to T2 ratio) of the constitutional unit represented by Formula (1) (T3 species) to the constitutional unit represented by Formula (2) (T2 species) of typically 5 or more, preferably 5 to 18, more preferably 6 to 16, and furthermore preferably 7 to 14. The cationically curable silicone resin, when having a T3 to T2 ratio of 5 or more, may contribute to significantly higher surface hardness and adhesiveness of the cured product and of the hardcoat layer.

The T3 to T2 ratio in silsesquioxane units of the cationically curable silicone resin may be determined typically by $^{29}$Si-NMR spectrum measurement. In a $^{29}$Si-NMR spectrum, the silicon atom in the constitutional unit represented by Formula (1) (T3 species) and the silicon atom in the constitutional unit represented by Formula (2) (T2 species) give signals (peaks) at different positions due to chemical shift. The peaks assigned to these silicon atoms are individually integrated, and the ratio between them is calculated to determine the T3 to T2 ratio. Specifically, for example, assume that the silsesquioxane units include a constitutional unit represented by Formula (1) in which $R^1$ is a 2-(3',4'-epoxycyclohexyl)ethyl group. In this case, the silicon atom in the structure represented by Formula (1) (T3 species) gives a signal appearing at −64 to −70 ppm, whereas the silicon atom in the structure represented by Formula (2) (T2 species) gives a signal appearing at −54 to −60 ppm. The T3 to T2 ratio in this case may be determined by individually integrating the signal at −64 to −70 ppm (assigned to T3 species) and the signal at −54 to −60 ppm (assigned to T2 species), and calculating the ratio of the former to the latter. Assume that the cationically curable silicone resin has a T3 to T2 ratio in silsesquioxane units of 5 or more. This means that the T2 species is present in a proportion at a certain level or higher relative to the T3 species.

The $^{29}$Si-NMR spectrum of the cationically curable silicone resin may be measured typically with an apparatus under conditions as follows:

Measuring apparatus: JNM-ECA 500 NMR (trade name, supplied by JEOL Ltd.)
Solvent: deuterated chloroform
Number of scans: 1800
Measurement temperature: 25° C.

Assume that the polyorganosilsesquioxane does not give intrinsic absorption peaks individually at around 1050 cm$^{-1}$ and at around 1150 cm$^{-1}$, but gives one intrinsic absorption peak at around 1100 cm$^{-1}$ in an FT-IR spectrum. In this case, it is verified that the cationically curable silicone resin includes silsesquioxane units that form a cage (partial cage) silsesquioxane structure (reference: R. H. Raney, M. Itoh, A. Sakakibara, and T. Suzuki, Chem. Rev. 95, 1409 (1995)). In contrast, a cationically curable silicone resin, when giving intrinsic absorption peaks individually at around 1050 cm$^{-1}$ and at around 1150 cm$^{-1}$ in an FT-IR spectrum, is identified to have a ladder silsesquioxane structure. The FT-IR spectra may be measured typically with an apparatus under conditions as follows:

Measuring apparatus: FT-720 (trade name, supplied by HORIBA, Ltd.)
Measurement method: through transmission
Resolution: 4 cm$^{-1}$
Measurement wavenumber range: 400 to 4000 cm$^{-1}$
Number of scans: 16

The cationically curable silicone resin preferably includes, as the silsesquioxane unit, the constitutional unit represented by Formula (1), but may include a constitutional unit represented by Formula (3) in combination with a constitutional unit represented by Formula (4). $R^3$ in Formula (3) is a cycloaliphatic-epoxy-containing group, and $R^4$ in Formula (4) is optionally substituted aryl. Formulae (3) and (4) are expressed as follows:

[Chem. 7]

(3)

[Chem. 8]

(4)

The cationically curable silicone resin may further include at least one siloxane constitutional unit selected from the class consisting of monofunctional constitutional units represented by the formula: $[(R^1)_3SiO_{1/2}]$ (so-called M units), bifunctional constitutional units represented by the formula: $[(R^1)_2SiO_{2/2}]$ (so-called D units), and tetrafunctional constitutional units represented by the formula: $[SiO_{4/2}]$ (so-called Q units), as another monomeric unit (silsesquioxane constitutional unit) than the constitutional units represented by Formulae (1) and (2) (T units), which are silsesquioxane units. The groups $R^1$ in the M units and D units are groups as in Formula (1).

The cationically curable silicone resin includes an epoxy-containing monomeric unit or units in a proportion of 50 mole percent or more (50 to 100 mole percent), preferably 55 to 100 mole percent, more preferably 65 to 99.9 mole percent, furthermore preferably 80 to 99 mole percent, and particularly preferably 90 to 99 mole percent, of the totality of siloxane constitutional units (the totality of all siloxane constitutional units: M units, D units, T units, and Q units) in the cationically curable silicone resin. The cationically curable silicone resin, if including epoxy-containing monomeric units in an excessively low proportion, may cause the cured product to have lower surface hardness.

The cationically curable silicone resin may have a proportion of the constitutional unit represented by Formula (1) (T3 species) of typically 50 mole percent or more (50 to 100 mole percent), preferably 60 to 99 mole percent, more preferably 70 to 98 mole percent, furthermore preferably 80 to 95 mole percent, and particularly preferably 85 to 92 mole percent, of the totality (100 mole percent) of siloxane constitutional units (the totality of all siloxane constitutional units: M units, D units, T units, and Q units) in the cationically curable silicone resin. The cationically curable silicone resin, if having a proportion of the constitutional unit represented by Formula (1) of less than 50 mole percent, may cause the cured product to have lower surface hardness. This is probably because the resulting curable composition may hardly form a partial cage structure having an appropriate molecular weight.

The cationically curable silicone resin may have a total proportion (totality) of the constitutional unit represented by Formula (1) (T3 species) and the constitutional unit represented by Formula (2) (T2 species) of typically 55 to 100 mole percent, preferably 65 to 100 mole percent, and more preferably 80 to 99 mole percent, of the totality (100 mole percent) of siloxane constitutional units (the totality of all siloxane constitutional units: M units, D units, T units, and Q units) in the cationically curable silicone resin. The cationically curable silicone resin, when having a total proportion of the two constitutional units of 55 mole percent or more, may allow the curable composition to have better curability and may allow the cured product to have surface hardness and adhesiveness at significantly higher levels.

The cationically curable silicone resin has a number-average molecular weight (Mn) of 1000 to 3000, preferably 1000 to 2800, and more preferably 1100 to 2600, as determined by GPC and calibrated with a polystyrene standard. The cationically curable silicone resin, as having a number-average molecular weight of 1000 or more, allows the cured product to have heat resistance, scratch resistance, and adhesiveness at still better levels. In contrast, the cationically curable silicone resin, as having a number-average molecular weight of 3000 or less, has better compatibility with another component in the curable composition and allows the cured product to have still better heat resistance.

The cationically curable silicone resin has a molecular-weight dispersity (Mw to Mn ratio) of typically 1.0 to 3.0, preferably 1.1 to 2.0, more preferably 1.2 to 1.9, and furthermore preferably 1.45 to 1.8, as determined by GPC and calibrated with a polystyrene standard. The cationically curable silicone resin, when having a molecular-weight dispersity of 3.0 or less, may allow the cured product to have surface hardness and adhesiveness at still higher levels. In contrast, the cationically curable silicone resin, when having a molecular-weight dispersity of 1.0 or more, tends to become liquid more readily and to offer better handleability.

The number-average molecular weight and the molecular-weight dispersity may be measured with an apparatus under conditions as follows:

Measuring apparatus: LC-20AD (trade name, supplied by Shimadzu Corporation)
Columns: two Shodex KF-801 columns, a KF-802 column, a KF-803 columns (supplied by Showa Denko K.K.)
Measurement temperature: 40° C.
Eluent: THF, in a sample concentration of 0.1 to 0.2 weight percent
Flow rate: 1 mL/min Detector: UV-VIS detector SPD-20A (trade name, supplied by Shimadzu Corporation)

Molecular weights: calibrated with a polystyrene standard

The cationically curable silicone resin may have a 5% weight loss temperature ($T_{d5}$) in an air atmosphere of typically 330° C. or higher (e.g., 330° C. to 450° C.), preferably 340° C. or higher, and more preferably 350° C. or higher. The cationically curable silicone resin, when having a 5% weight loss temperature of 330° C. or higher, tends to allow the cured product to have still better heat resistance. In particular, the polyorganosilsesquioxane can be controlled to have a 5% weight loss temperature of 330° C. or higher when having a T3 to T2 ratio of 5 or more, a number-average molecular weight of 1000 to 3000, and a molecular-weight dispersity of 1.0 to 3.0, and giving one intrinsic peak at around 1100 cm$^{-1}$ in an FT-IR spectrum. The "5% weight loss temperature" refers to a temperature at the time point when a sample heated at a predetermined rate of temperature rise loses 5% of its initial weight (weight before heating). The 5% weight loss temperature serves as an index for heat resistance. The 5% weight loss temperature may be measured by thermogravimetry (TGA) in an air atmosphere at a rate of temperature rise of 5° C./min.

The curable composition may include the cationically curable silicone resin in a content (proportion) of typically from 70 weight percent to less than 100 weight percent, preferably 80 to 99.8 weight percent, and more preferably 90 to 99.5 weight percent, of the totality of the curable composition excluding solvents. The curable composition, when containing the cationically curable silicone resin in a content of 70 weight percent or more, tends to allow the cured product to have surface hardness and adhesiveness at still better levels. In contrast, the curable composition, when containing the cationically curable silicone resin in a content of less than 100 weight percent, is allowed to contain the curing catalyst and thereby undergoes curing that proceeds more efficiently.

The curable composition may contain the cationically curable silicone resin in a proportion of typically 70 to 100 weight percent, preferably 75 to 98 weight percent, and more preferably 80 to 95 weight percent, of the totality (100 weight percent) of all cationically curable compounds contained in the curable composition. The curable composition, when containing the cationically curable silicone resin in a content of 70 weight percent or more, tends to allow the cured product to have surface hardness and adhesiveness at still better levels.

Cationically Curable Silicone Resin Production Method

The cationically curable silicone resin may be produced by any of known or common methods for producing polyorganosiloxanes and may be produced typically by a method of hydrolyzing and condensing one or more hydrolyzable silane compounds. However, the one or more hydrolyzable silane compounds for use herein should include, as an essential hydrolyzable silane compound, a hydrolyzable trifunctional silane compound (a compound represented by Formula (a)) to form the constitutional unit represented by Formula (1).

More specifically, the cationically curable silicone resin may be produced typically by a method in which the compound represented by Formula (a) (hydrolyzable trifunctional silane compound) is hydrolyzed and condensed, where the compound represented by Formula (a) is a hydrolyzable silane compound to form the silsesquioxane constitutional unit (T unit) in the cationically curable silicone resin. Formula (a) is expressed as follows:

[Chem. 9]

$$R^1Si(X^1)_3 \qquad (a)$$

The compound represented by Formula (a) is a compound to form the constitutional unit represented by Formula (1). $R^1$ in Formula (a) is as with $R^1$ in Formula (1) and is selected from an epoxy-containing group (monovalent group), hydrogen, and a hydrocarbon group (monovalent group). Specifically, $R^1$ in Formula (a) is preferably selected from the groups represented by Formula (1a) to (1d), is more preferably selected from the groups represented by Formula (1a) and the groups represented by Formula (1c), is furthermore preferably selected from the groups represented by Formula (1a), is particularly preferably selected from the groups represented by Formula (1a) in which $R^{1a}$ is ethylene, and is especially preferably a 2-(3',4'-epoxycyclohexyl) ethyl group.

$X^1$ in Formula (a) is, independently in each occurrence, selected from alkoxy and halogen. Non-limiting examples of the alkoxy as $X^1$ include $C_1$-$C_4$ alkoxys such as methoxy, ethoxy, propoxy, isopropyloxy, butoxy, and isobutyloxy. Non-limiting examples of the halogen as $X^1$ include fluorine, chlorine, bromine, and iodine. In particular, $X^1$ is preferably selected from alkoxys and is more preferably selected from methoxy and ethoxy. The three occurrences of $X^1$ may be identical to or different from one another.

The cationically curable silicone resin may be derived from (formed from) compounds further including one or more other hydrolyzable trifunctional silane compounds in addition to the compound(s) represented by Formula (a). Non-limiting examples of the other hydrolyzable trifunctional silane compounds than the compounds represented by Formula (a) include hydrolyzable monofunctional silane compounds represented by the formula: $[(R^1)_3SiX^1]$ to form M units; hydrolyzable bifunctional silane compounds represented by the formula: $[(R^1)_2Si(X^1)_2]$ to form D units; and hydrolyzable tetrafunctional silane compounds represented by the formula: $[Si(X^1)_4]$ to form Q units. $R^1$ and $X^1$ in these monomers are as in Formula (a).

The amounts and formula (proportions) of the hydrolyzable silane compounds may be adjusted as appropriate according to the desired structure of the cationically curable silicone resin. For example, the compound represented by Formula (a) may be used in an amount of typically 55 to 100 mole percent, preferably 65 to 100 mole percent, and more preferably 80 to 99 mole percent, of the totality (100 mole percent) of all hydrolyzable silane compounds to be used.

When two or more different hydrolyzable silane compounds are used, the reactions of hydrolysis and condensation of these hydrolyzable silane compounds may be performed simultaneously or non-simultaneously. The reactions, when performed non-simultaneously, may be performed in any sequence not limited.

The hydrolysis and condensation of the hydrolyzable silane compound(s) may be performed in the presence of, or in the absence of, a solvent. In particular, the hydrolysis and condensation is preferably performed in the presence of a solvent. Non-limiting examples of the solvent include aromatic hydrocarbons such as benzene, toluene, xylenes, and ethylbenzene; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; and alcohols such as methanol, ethanol, isopropyl alcohol, and butanol. Among them, the solvent is preferably selected from ketones and ethers. Each of different solvents may be used alone or in combination.

The amount of the solvent is not limited and may be adjusted as appropriate according typically to the desired reaction time, within the range of 0 to 2000 parts by weight per 100 parts by weight of the totality of the hydrolyzable silane compound(s).

The hydrolysis and condensation of the hydrolyzable silane compound(s) is preferably performed in the presence of a catalyst and water. The catalyst may be either of an acid catalyst and an alkaline catalyst. Non-limiting examples of the acid catalyst include mineral acids such as hydrochloric acid, sulfuric acid, nitric acid, phosphoric acid, and boric acid; phosphoric esters; carboxylic acids such as acetic acid, formic acid, and trifluoroacetic acid; sulfonic acids such as methanesulfonic acid, trifluoromethanesulfonic acid, and p-toluenesulfonic acid; solid acids such as activated clay; and Lewis acids such as iron chloride. Non-limiting examples of the alkaline catalyst include alkali metal hydroxides such as lithium hydroxide, sodium hydroxide, potassium hydroxide, and cesium hydroxide; alkaline earth metal hydroxides such as magnesium hydroxide, calcium hydroxide, and barium hydroxide; alkali metal carbonates such as lithium carbonate, sodium carbonate, potassium carbonate, and cesium carbonate; alkaline earth metal carbonates such as magnesium carbonate; alkali metal hydrogencarbonates such as lithium hydrogencarbonate, sodium hydrogencarbonate, potassium hydrogencarbonate, and cesium hydrogencarbonate; alkali metal organic acid salts such as lithium acetate, sodium acetate, potassium acetate, and cesium acetate, of which acetates are typified; alkaline earth metal organic acid salts such as magnesium acetate, of which acetates are typified; alkali metal alkoxides such as lithium methoxide, sodium methoxide, sodium ethoxide, sodium isopropoxide, potassium ethoxide, and potassium t-butoxide; alkali metal phenoxides such as sodium phenoxide; amines such as triethylamine, N-methylpiperidine, 1,8-diazabicyclo[5.4.0]undec-7-ene, and 1,5-diazabicyclo[4.3.0]non-5-ene, of which tertiary amines are typified; and nitrogen-containing heteroaromatic compounds such as pyridine, 2,2'-bipyridyl, and 1,10-phenanthroline. Each of different catalysts may be used alone or in combination. The catalyst may also be used in the form of a solution or dispersion typically in water and/or a solvent.

The amount of the catalyst is not limited and may be adjusted as appropriate within the range of 0.002 to 0.200 mole per mole of the totality of the hydrolyzable silane compound(s).

The amount of water in the hydrolysis and condensation is not limited and may be adjusted as appropriate within the range of 0.5 to 20 moles per mole of the totality of the hydrolyzable silane compound(s).

The water may be added in any manner not limited and may be added collectively in the whole quantity (the total amount to be used), or non-collectively. The water, when added non-collectively, may be added continuously or intermittently.

The hydrolysis and condensation may be performed at a reaction temperature of typically 40° C. to 100° C., and preferably 45° C. to 80° C. The hydrolysis and condensation, when performed at a reaction temperature controlled within the range, tends to enable more efficient control of the T3 to T2 ratio to 5 or more. The hydrolysis and condensation may be performed for a reaction time of typically 0.1 to 10 hours, and preferably 1.5 to 8 hours. The hydrolysis and condensation may be performed at normal atmospheric pressure, under pressure (under a load), or under reduced pressure.

The atmosphere in which the hydrolysis and condensation is performed is not limited and may be any atmosphere exemplified typically by inert gas atmospheres such as nitrogen atmosphere and argon atmosphere; and atmospheres in the presence of oxygen, such as air atmosphere. However, the atmosphere is preferably an inert gas atmosphere.

The hydrolysis and condensation of the hydrolyzable silane compound(s) gives the cationically curable silicone resin for use in the present invention. After the completion of the hydrolysis and condensation, the catalyst is preferably neutralized so as to restrain ring-opening of epoxy groups. The cationically curable silicone resin for use in the present invention may be separated/purified typically by a separation means such as water washing (rinsing), acid washing, alkali washing, filtration, concentration, distillation, extraction, crystallization, recrystallization, or column chromatography, or by a separation means as any combination of them.

Epoxy Compound

The curable composition may further include an epoxy compound other than the cationically curable silicone resin. The curable composition, when including such an epoxy compound in addition to the cationically curable silicone resin, can form a cured product that has high surface hardness and offers flexibility and workability at excellent levels.

The epoxy compound for use herein may be selected from known or common compounds containing one or more epoxy groups (oxirane rings) in a molecule, is not limited, but is exemplified typically by cycloaliphatic epoxy compounds (cycloaliphatic epoxy resins), aromatic epoxy compounds (aromatic epoxy resins), and aliphatic epoxy compounds (aliphatic epoxy resins). Among them, cycloaliphatic epoxy compounds are preferred.

The cycloaliphatic epoxy compounds may be selected from known or common compounds containing one or more alicycles and one or more epoxy groups in a molecule, are not limited, but exemplified typically by (1) compounds containing an alicycle and a cycloaliphatic epoxy group in a molecule, where the "cycloaliphatic epoxy group" refers to an epoxy group containing an oxygen atom bonded in a triangular arrangement to two adjacent carbon atoms constituting the alicycle; (2) compounds containing an alicycle and an epoxy group bonded to the alicycle directly through a single bond; and (3) compounds containing an alicycle and a glycidyl ether group in a molecule (glycidyl ether epoxy compounds).

The compounds (1) containing a cycloaliphatic epoxy group in a molecule for use herein may be arbitrarily selected from known or common ones. In particular, the cycloaliphatic epoxy group is preferably a cyclohexene oxide group; and of the compounds (1), preferred are compounds represented by Formula (i):

[Chem. 10]

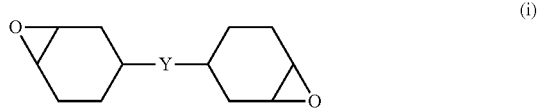

(i)

In Formula (i), Y is selected from a single bond and a linkage group (divalent group containing one or more atoms). Non-limiting examples of the linkage group include divalent hydrocarbon groups, alkenylenes with part or all of carbon-carbon double bond(s) being epoxidized, carbonyl, ether bond, ester bond, carbonate group, amido, and groups each including two or more of them linked to each other.

Non-limiting examples of the divalent hydrocarbon group include $C_1$-$C_{18}$ linear or branched alkylenes and divalent alicyclic hydrocarbon groups. Non-limiting examples of the $C_1$-$C_{18}$ linear or branched alkylenes include methylene, methylmethylene, dimethylmethylene, ethylene, propylene, and trimethylene. Non-limiting examples of the divalent alicyclic hydrocarbon groups include divalent cycloalkylenes (including cycloalkylidenes), such as 1,2-cyclopentylene, 1,3-cyclopentylene, cyclopentylidene, 1,2-cyclohexylene, 1,3-cyclohexylene, 1,4-cyclohexylene, and cyclohexylidene.

The alkenylenes with part or all of carbon-carbon double bond(s) being epoxidized are also referred to as "epoxidized alkenylenes". Non-limiting examples of alkenylenes from which the epoxidized alkenylenes are derived include $C_2$-$C_8$ linear or branched alkenylenes such as vinylene, propenylene, 1-butenylene, 2-butenylene, butadienylene, pentenylene, hexenylene, heptenylene, and octenylene. Of the epoxidized alkenylenes, preferred are alkenylenes with all of carbon-carbon double bond(s) being epoxidized, and more preferred are $C_2$-$C_4$ alkenylenes with all of carbon-carbon double bond(s) being epoxidized.

Representative, but non-limiting examples of the cycloaliphatic epoxy compounds represented by Formula (i) include 3,4,3',4'-diepoxybicyclohexane, and compounds represented by Formulae (i-1) to (i-10) below. In Formulae (i-5) and (i-7), 1 and m each independently represent an integer of 1 to 30. In Formula (i-5), R' represents, independently in each occurrence, $C_1$-$C_8$ alkylene and is preferably selected from $C_1$-$C_3$ linear or branched alkylenes such as methylene, ethylene, propylene, and isopropylene. In Formulae (i-9) and (i-10), n1 to n6 each independently represent an integer of 1 to 30. Non-limiting examples of the cycloaliphatic epoxy compounds represented by Formula (i) also include 2,2-bis(3,4-epoxycyclohexyl)propane, 1,2-bis(3,4-epoxycyclohexyl)ethane, 2,3-bis(3,4-epoxycyclohexyl)oxirane, and bis(3,4-epoxycyclohexylmethyl) ether. Formulae (i-1) to (i-10) are expressed as follows:

[Chem. 11]

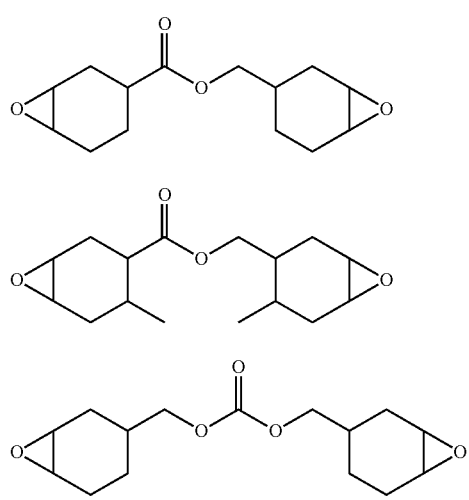

(1-1)

(1-2)

(1-3)

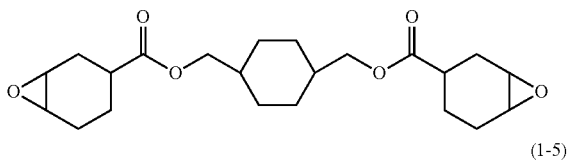

(1-4)

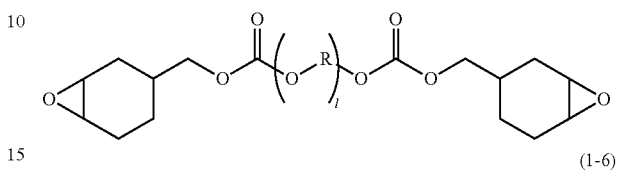

(1-5)

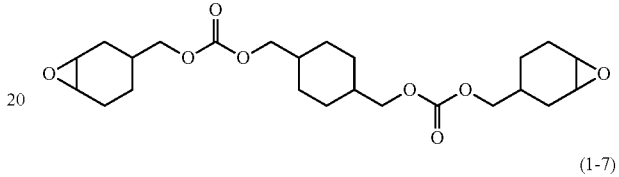

(1-6)

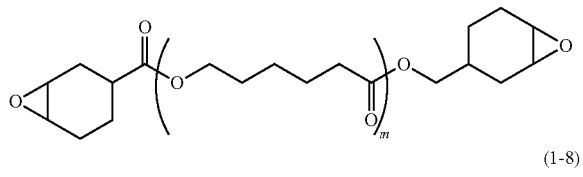

(1-7)

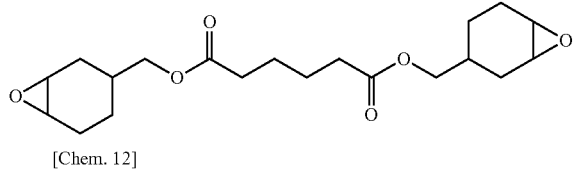

(1-8)

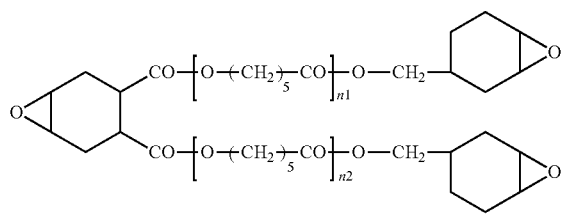

[Chem. 12]

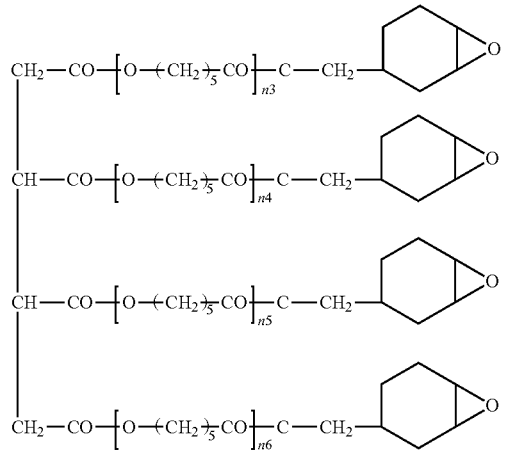

(1-9)

(1-10)

Non-limiting examples of the compounds (2) containing an alicycle and an epoxy group bonded directly to the alicycle through a single bond include compounds represented by Formula (ii):

[Chem. 13]

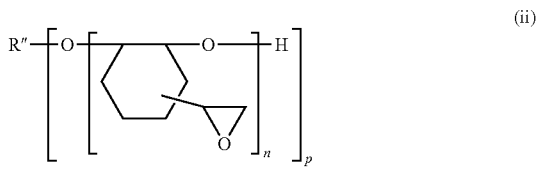

In Formula (ii), R″ represents a group (p-valent organic group) resulting from removing "p" hydroxy group(s) (—OH) from the structural formula of a p-hydric alcohol; and p and n each independently represent a natural number. Non-limiting examples of the p-hydric alcohol (R″(OH)$_p$) include polyhydric alcohols such as 2,2-bis(hydroxymethyl)-1-butanol, of which $C_1$-$C_{15}$ alcohols are typified. The number p is preferably 1 to 6, and n is preferably 1 to 30. When p is 2 or more, the "p" occurrences of n in the groups in the brackets (outer brackets) may be identical or different. Specifically, a non-limiting example of the compounds represented by Formula (ii) is a 1,2-epoxy-4-(2-oxiranyl)cyclohexane adduct of 2,2-bis(hydroxymethyl)-1-butanol, such as EHPE 3150 (trade name, supplied by Daicel Corporation).

Non-limiting examples of the compounds (3) containing an alicycle and a glycidyl ether group in a molecule include glycidyl ethers of alicyclic alcohols (in particular, of alicyclic polyhydric alcohols). More specifically, non-limiting examples of the compounds (3) include hydrogenated bisphenol-A epoxy compounds, which are compounds resulting from hydrogenating bisphenol-A epoxy compounds, such as 2,2-bis[4-(2,3-epoxypropoxy)cyclohexyl]propane and 2,2-bis[3,5-dimethyl-4-(2,3-epoxypropoxy)cyclohexyl; hydrogenated bisphenol-F epoxy compounds, which are compounds resulting from hydrogenating bisphenol-F epoxy compounds, such as bis[o,o-(2,3-epoxypropoxy)cyclohexyl] methane, bis[o,p-(2,3-epoxypropoxy)cyclohexyl]methane, bis[p,p-(2,3-epoxypropoxy)cyclohexyl]methane, and bis[3,5-dimethyl-4-(2,3-epoxypropoxy)cyclohexyl]methane; hydrogenated biphenol epoxy compounds; hydrogenated phenol novolac epoxy compounds; hydrogenated cresol novolac epoxy compounds; hydrogenated cresol novolac epoxy compounds derived from bisphenol-A; hydrogenated naphthalene epoxy compounds; hydrogenated epoxy compounds resulting from hydrogenating epoxy compounds derived from trisphenolmethane; and hydrogenated epoxy compounds resulting from hydrogenating aromatic epoxy compounds as mentioned below.

Non-limiting examples of the aromatic epoxy compounds include epi-bis glycidyl ether epoxy resins resulting from condensing bisphenols with epihalohydrins, where the bisphenols are exemplified typically by bisphenol-A, bisphenol-F, bisphenol-S, and fluorene-bisphenol; high-molecular-weight epi-bis glycidyl ether epoxy resins resulting from subjecting the epi-bis glycidyl ether epoxy resins further to addition reactions with the bisphenols; novolac-alkyl glycidyl ether epoxy resins resulting from condensing phenols with aldehydes to give polyhydric alcohols, and further condensing the polyhydric alcohols with epihalohydrins, where the phenols are exemplified typically by phenol, cresols, xylenols, resorcinol, catechol, bisphenol-A, bisphenol-F, and bisphenol-S, and the aldehydes are exemplified typically by formaldehyde, acetaldehyde, benzaldehyde, hydroxybenzaldehyde, and salicylaldehyde; and epoxy compounds which contain a fluorene ring and two phenolic skeletons bonded at the 9-position of the fluorene ring, and which contain glycidyl groups individually bonded to oxygen atoms directly or through alkyleneoxy, where the oxygen atoms result from removing hydrogen atoms from the hydroxy groups of these phenolic skeletons.

Non-limiting examples of the aliphatic epoxy compounds include glycidyl ethers of q-hydric alcohols devoid of cyclic structures, where q is a natural number; glycidyl esters of monovalent or multivalent carboxylic acids such as acetic acid, propionic acid, butyric acid, stearic acid, adipic acid, sebacic acid, maleic acid, and itaconic acid; epoxidized derivatives of double-bond-containing fats and oils, such as epoxidized linseed oils, epoxidized soybean oils, and epoxidized castor oils; and epoxidized derivatives of polyolefins (including polyalkadienes), such as epoxidized polybutadienes. Non-limiting examples of the q-hydric alcohols devoid of cyclic structures include monohydric alcohols such as methanol, ethanol, 1-propyl alcohol, isopropyl alcohol, and 1-butanol; dihydric alcohols such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycol, and polypropylene glycol; and trihydric or higher-hydric alcohols such as glycerol, diglycerol, erythritol, trimethylolethane, trimethylolpropane, pentaerythritol, dipentaerythritol, and sorbitol. The q-hydric alcohols may also be selected typically from polyether polyols, polyester polyols, polycarbonate polyols, and polyolefin polyols.

The curable composition may contain the epoxy compound in a content (proportion) of typically 0.5 to 100 parts by weight, preferably 1 to 80 parts by weight, and more preferably 5 to 50 parts by weight, per 100 parts by weight of the cationically curable silicone resin for use in the present invention. The curable composition, when containing the epoxy compound in a content of 0.5 part by weight or more, tends to allow the cured product to have still higher surface hardness and to offer flexibility and workability at still better levels. In contrast, the curable composition, when containing the epoxy compound in a content of 100 parts by weight or less, tends to allow the cured product to have still better scratch resistance.

Leveling Agent

The curable composition includes a leveling agent so as to provide better surface smoothness. The leveling agent for use herein has only to have a capability of reducing surface tension and may be selected from common leveling agents. The leveling agent is preferably selected from silicone leveling agents and fluorine leveling agents, and is more preferably selected from silicone leveling agents, for their excellent capability of reducing surface tension. In the present invention, the combination use of the cationically curable silicone resin with the leveling agent can give better surface smoothness and provide better properties such as transparency, gloss (appearance), and slip. In addition, the use of a specific leveling agent in a specific amount can give surface hardness and scratch resistance at still better levels.

The silicone leveling agents are leveling agents including compounds containing a polysiloxane skeleton. The polyorganosiloxane skeleton has only to be a polyorganosiloxane including (formed from) one or more of M units, D units, T units, and Q units, as with the cationically curable silicone resin. In general, the silicone leveling agent for use herein is preferably selected from polyorganosiloxanes including D units. The organic groups (organic moieties) in the polyorganosiloxanes are generally selected from $C_1$-$C_4$ alkyls and aryls, are more generally selected from methyl and phenyl, and are particularly generally methyl. The repetition number (degree of polymerization) of siloxane units is typically 2 to 3000, preferably 3 to 2000, and more preferably 5 to 1000.

The fluorine leveling agents are leveling agents containing fluorinated aliphatic hydrocarbon skeletons. Non-limiting examples of the fluorinated aliphatic hydrocarbon skeletons include fluoro-$C_1$-$C_{10}$ alkanes such as fluoromethanes, fluoroethanes, fluoropropanes, fluoroisopropanes, fluorobutanes, fluoroisobutanes, fluoro-t-butanes, fluoropentanes, and fluorohexanes.

These fluorinated aliphatic hydrocarbon skeletons have only to result from replacing at least part of hydrogen atoms with fluorine atom or atoms, but are preferably perfluorinated aliphatic hydrocarbon skeletons resulting from replacing all hydrogen atoms with fluorine atoms. This is preferred in view of giving scratch resistance, slip, and anti-fouling properties at better levels.

The fluorinated aliphatic hydrocarbon skeletons may each form a polyfluoroalkylene ether skeleton, which is a constitutional repeating unit through an ether bond. The fluorinated aliphatic hydrocarbon group as a constitutional repeating unit may also be at least one selected from the class consisting of fluoro-$C_1$-$C_4$ alkylene groups such as fluoromethylenes, fluoroethylenes, fluoropropylenes, and fluoroisopropylenes. The repetition number (degree of polymerization) of the polyfluoroalkylene ether unit is typically 10 to 3000, preferably 30 to 1000, and more preferably 50 to 500.

Of these skeletons, polyorganosiloxane skeletons are preferred for their excellent affinity for the cationically curable silicone resin.

The leveling agents having skeletons as above may each have one or more functional groups so as to offer various functionalities. Non-limiting examples of the functional groups include hydrolytically condensable groups, groups reactive with epoxy group (epoxy-reactive groups), radically polymerizable groups, polyether groups, polyester groups, and polyurethane groups. The silicone leveling agents may each contain a fluorinated aliphatic hydrocarbon group; and the fluorine leveling agents may each contain a polyorganosiloxane group.

Non-limiting examples of the hydrolytically condensable groups include hydroxysilyl; trihalosilyls such as trichlorosilyl; dihalo($C_1$-$C_4$ alkyl)silyls such as dichloromethylsilyl; dihaloaryls such as dichlorophenylsilyl; halodi($C_1$-$C_4$ alkyl)silyls exemplified typically by chlorodi($C_1$-$C_4$ alkyl) silyls such as chlorodimethylsilyl; tri($C_1$-$C_4$ alkoxy)silyls such as trimethoxysilyl and triethoxysilyl; di($C_1$-$C_4$ alkoxy) ($C_1$-$C_4$ alkyl)silyls such as dimethoxymethylsilyl and diethoxymethylsilyl; di($C_1$-$C_4$ alkoxy)arylsilyls such as dimethoxyphenylsilyl and diethoxyphenylsilyl; $C_1$-$C_4$ alkoxydi($C_1$-$C_4$ alkyl)silyls such as methoxydimethylsilyl and ethoxydimethylsilyl; $C_1$-$C_4$ alkoxydiarylsilyls such as methoxydiphenylsilyl and ethoxydiphenylsilyl; and $C_1$-$C_4$ alkoxy($C_1$-$C_4$ alkyl)arylsilyls such as methoxymethylphenylsilyl and ethoxymethylphenylsilyl. Among them, tri($C_1$-$C_4$ alkoxy)silyls, such as trimethoxysilyl, are preferred in view typically of reactivity.

Non-limiting examples of the epoxy-reactive groups include hydroxys, aminos, carboxys, acid anhydride groups (such as maleic anhydride group), and isocyanate groups. Among them, hydroxys, aminos, acid anhydride groups, and isocyanate groups are generally employed in view of reactivity, and hydroxys are preferably employed in view typically of handleability and availability.

Non-limiting examples of the radically polymerizable groups include (meth)acryloyloxy and vinyl, of which (meth)acryloyloxy is generally employed.

Non-limiting examples of the polyether groups include polyoxy-$C_2$-$C_4$ alkylenes such as polyoxyethylenes, polyoxypropylenes, polyoxybutylenes, and polyoxyethylene-polyoxypropylenes. The polyether groups may each have a repetition number (number of moles to be added) of oxyalkylene groups of typically 2 to 1000, preferably 3 to 100, and more preferably 5 to 50. Of these polyether groups, preferred are polyoxy-$C_2$ or $C_3$-alkylenes such as polyoxyethylenes and polyoxypropylenes, of which polyoxyethylenes are particularly preferred.

Non-limiting examples of the polyester groups include polyester groups each resulting from reaction of a dicarboxylic acid with a diol, where the dicarboxylic acid is exemplified typically by aromatic carboxylic acids such as terephthalic acid, and aliphatic carboxylic acids such as adipic acid, and the diol is exemplified typically by aliphatic diols such as ethylene glycol; and polyester groups each resulting from ring-opening polymerization of a cyclic ester, where the cyclic ester is exemplified typically by lactones such as caprolactone.

Non-limiting examples of the polyurethane groups include common polyester polyurethane groups and polyether polyurethane groups.

These functional groups may each be introduced into the polyorganosiloxane skeleton or fluorinated aliphatic hydrocarbon skeleton directly through a bond, or indirectly through a linkage group. Non-limiting examples of the linkage group include alkylenes, cycloalkylenes, ether groups, ester groups, amido, urethane groups, and linkage groups including two or more of them in combination.

Of these functional groups, preferred are hydrolytically condensable groups and epoxy-reactive groups, more preferred are epoxy-reactive groups, and particularly preferred is hydroxy. These groups are preferred because they react with the cationically curable silicone resin to allow the cured product to have higher hardness.

The hydroxy may also be terminal hydroxy of (poly) oxyalkylene groups such as (poly)oxyethylene group. Non-limiting examples of leveling agents of this type include polydimethylsiloxanepolyoxyethylenes and other silicone leveling agents each resulting from introducing a (poly)oxy-$C_2$ or $C_3$ alkylene group (such as a (poly)oxyethylene group) into the side chain of a polydimethylsiloxane or another polyorganosiloxane skeleton; and fluoroalkylpolyoxyethylenes and other fluorine leveling agents each resulting from introducing a fluorinated aliphatic hydrocarbon group into the side chain of a (poly)oxyethylene or another (poly)oxy-$C_2$ or $C_3$ alkylene skeleton.

The silicone leveling agents for use herein may also be selected from commercially available silicone leveling agents, available typically under the trade names of BYK-300, BYK-301/302, BYK-306, BYK-307, BYK-310, BYK-315, BYK-313, BYK-320, BYK-322, BYK-323, BYK-325, BYK-330, BYK-331, BYK-333, BYK-337, BYK-341, BYK-344, BYK-345/346, BYK-347, BYK-348, BYK-349, BYK-370, BYK-375, BYK-377, BYK-378, BYK-UV 3500, BYK-UV 3510, BYK-UV 3570, BYK-3550, BYK-SILCLEAN 3700, and BYK-SILCLEAN 3720 (each from BYK Japan KK); the trade names of AC FS 180, AC FS 360, and AC S 20 (each from Algin-Chemie); the trade names of POLYFLOW KL-400X, POLYFLOW KL-400HF, POLYFLOW KL-401, POLYFLOW KL-402, POLYFLOW KL-403, and POLYFLOW KL-404 (each from Kyoeisha Chemical Co., Ltd.); the trade names of KP-323, KP-326, KP-341, KP-104, KP-110, and KP-112 (each from Shin-Etsu Chemical Co., Ltd.); and the trade names of LP-7001, LP-7002, 8032 ADDITIVE, 57 ADDITIVE, L-7604, FZ-2110, FZ-2105, 67 ADDITIVE, 8618 ADDITIVE, 3 ADDITIVE, and 56 ADDITIVE (each from Dow Corning Toray Co., Ltd.).

The fluorine leveling agents for use herein may also be selected from commercially available fluorine leveling agents, available typically under the trade names of OPTOOL DSX and OPTOOL DAC-HP (each from Daikin Industries Ltd.); the trade names of Surflon S-242, Surflon S-243, Surflon S-420, Surflon S-611, Surflon S-651, and Surflon S-386 (each from AGC Seimi Chemical Co., Ltd.); the trade name of BYK-340 (BYK Japan KK); the trade names of AC 110a and AC 100a (each from Algin-Chemie); the trade names of Megafac F-114, Megafac F-410, Megafac F-444, Megafac EXP TP-2066, Megafac F-430, Megafac F-472SF, Megafac F-477, Megafac F-552, Megafac F-553, Megafac F-554, Megafac F-555, Megafac R-94, Megafac RS-72-K, Megafac RS-75, Megafac F-556, Megafac EXP TF-1367, Megafac EXP TF-1437, Megafac F-558, and Megafac EXP TF-1537 (each from DIC Corporation); the trade names of FC-4430 and FC-4432 (each from Sumitomo 3M Limited); the trade names of FTERGENT 100, FTERGENT 100C, FTERGENT 110, FTERGENT 150, FTERGENT 150CH, FTERGENT A-K, FTERGENT 501, FTERGENT 250, FTERGENT 251, FTERGENT 222F, FTERGENT 208G, FTERGENT 300, FTERGENT 310, and FTERGENT 400SW (each from NEOS Co., Ltd.); and the trade names of PF-136A, PF-156A, PF-151N, PF-636, PF-6320, PF-656, PF-6520, PF-651, PF-652, and PF-3320 (each from Kitamura Chemicals, Co., Ltd.).

The curable composition may include each of different leveling agents alone or in combination. Of these leveling agents, preferred are hydroxy-containing silicone leveling agents, because they have excellent affinity for the cationically curable silicone resin, are reactive with epoxy groups, and allow the cured product to have higher hardness and better appearance.

Non-limiting examples of the hydroxy-containing silicone leveling agents include polyether-modified polyorganosiloxanes each resulting from introducing a polyether group into the principal chain or side chain of a polydimethylsiloxane or another polyorganosiloxane skeleton; polyester-modified polyorganosiloxanes each resulting from introducing a polyester group into the principal chain or side chain of a polyorganosiloxane skeleton; and silicon-modified (meth)acrylic resins each resulting from introducing a polyorganosiloxane into a (meth)acrylic resin. The hydroxy groups in these leveling agents may each have a polyorganosiloxane skeleton and/or may have a polyether group, a polyester group, or a (meth)acryloyl group. Leveling agents of this type for use herein may be available as commercial products typically under the trade names of BYK-370, BYK-SILCLEAN 3700, and BYK-SILCLEAN 3720.

The curable composition may contain the leveling agent in a proportion of typically 0.01 to 20 parts by weight, preferably 0.05 to 15 parts by weight, more preferably 0.01 to 10 parts by weight, and furthermore preferably 0.2 to 5 parts by weight, per 100 parts by weight of the cationically curable silicone resin. The curable composition, if containing the leveling agent in an excessively low proportion, may cause the cured product to have lower surface smoothness; and, if containing the leveling agent in an excessively high proportion, may cause the cured product to have lower surface hardness.

In particular, the leveling agent, when being a silicone leveling agent, may be present in a proportion of typically 0.01 to 10 parts by weight, preferably 0.05 to 5 parts by weight, more preferably 0.1 to 3 parts by weight, furthermore preferably 0.2 to 2 parts by weight, and particularly preferably 0.3 to 1.5 parts by weight, per 100 parts by weight of the cationically curable silicone resin. The leveling agent, when being a hydroxy-containing silicone leveling agent, may be present in a proportion of typically 0.01 to 5 parts by weight, preferably 0.05 to 4 parts by weight, more preferably 0.1 to 3 parts by weight, furthermore preferably 0.2 to 2 parts by weight, and particularly preferably 0.3 to 1.5 parts by weight, per 100 parts by weight of the cationically curable silicone resin.

The leveling agent, particularly when being a fluorine leveling agent, may be present in a proportion of typically 0.05 to 5 parts by weight, preferably 0.1 to 3 parts by weight, more preferably 0.15 to 2 parts by weight, furthermore preferably 0.2 to 1 part by weight, and particularly preferably 0.3 to 0.8 part by weight, per 100 parts by weight of the cationically curable silicone resin. The curable composition, when containing the leveling agent in a proportion within the ranges, allows the cured product not only to have better surface smoothness, but also to have higher surface hardness, where such a function of improving surface hardness has not been expected as a function of leveling agents.

Curing Catalyst

The curable composition preferably further includes a curing catalyst. The curable composition particularly preferably includes a cationic photoinitiator (photocationic polymerization initiator) as the curing catalyst. This is preferred because the curable composition can be cured within a shorter curing time, where the curing time is a time necessary for the cured product to be tack-free.

The curing catalyst is a compound that can initiate and/or promote cationic polymerization reactions of cationically curable compounds such as the cationically curable silicone resin. Non-limiting examples of the curing catalyst include polymerization initiators such as cationic photoinitiators (photoacid generators) and cationic thermal initiators (thermal acid generators).

The cationic photoinitiators for use herein may be selected from known or common cationic photoinitiators and are exemplified typically by sulfonium salts (salts between a sulfonium ion and an anion), iodonium salts (salts between an iodonium ion and an anion), selenium salts (salts between a selenium ion and an anion), ammonium salts (salts between an ammonium ion and an anion), phosphonium salts (salts between a phosphonium ion and an anion), and salts between a transition metal complex ion and an anion.

Non-limiting examples of the sulfonium salts include triarylsulfonium salts such as triphenylsulfonium salts, tri-p-tolylsulfonium salts, tri-o-tolylsulfonium salts, tris(4-methoxyphenyl)sulfonium salts, 1-naphthyldiphenylsulfonium salts, 2-naphthyldiphenylsulfonium salts, tris(4-fluorophenyl)sulfonium salts, tri-1-naphthylsulfonium salts, tri-2-naphthylsulfonium salts, tris(4-hydroxyphenyl)sulfonium salts, diphenyl[4-(phenylthio)phenyl]sulfonium salts, and 4-(p-tolylthio)phenyldi-(p-phenyl)sulfonium salts; diarylsulfonium salts such as diphenylphenacylsulfonium salts, diphenyl(4-nitrophenacyl)sulfonium salts, diphenylbenzylsulfonium salts, and diphenylmethylsulfonium salts; monoarylsulfonium salts such as phenylmethylbenzylsulfonium salts, 4-hydroxyphenylmethylbenzylsulfonium salts, and 4-methoxyphenylmethylbenzylsulfonium salts; and trialkylsulfonium salts such as dimethylphenacylsulfonium salts, phenacyltetrahydrothiophenium salts, and dimethylbenzylsulfonium salts.

The diphenyl[4-(phenylthio)phenyl]sulfonium salts for use herein may be selected from commercial products available typically under the trade name of CPI-101A (from San-Apro Ltd., a 60% solution of diphenyl[4-(phenylthio)phenyl]sulfonium hexafluoroantimonate in propylene carbonate); and the trade name of CPI-LOOP (from San-Apro Ltd., a 50% solution of diphenyl[4-(phenylthio)phenyl]sulfonium hexafluorophosphate in propylene carbonate). The triarylsulfonium salts for use herein may also be selected from commercial products typically of [4-(4-biphenylthio)phenyl]-4-biphenylphenylsulfonium tris(pentafluoroethyl)trifluorophosphate.

Non-limiting examples of the iodonium salts include UV9380C (trade name, supplied by Momentive Performance Materials Japan LLC, a 45% solution of bis(4-dodecylphenyl)iodonium hexafluoroantimonate in an alkyl glycidyl ether), RHODORSIL PHOTOINITIATOR 2074 (trade name, supplied by Rhodia Japan, Ltd., [(1-methylethyl)phenyl](methylphenyl)iodonium tetrakis(pentafluorophenyl)borate), WPI-124 (trade name, supplied by Wako Pure Chemical Industries, Ltd.), diphenyliodonium salts, di-p-tolyliodonium salts, bis(4-dodecylphenyl)iodonium salts, and bis(4-methoxyphenyl)iodonium salts.

Non-limiting examples of the selenium salts include triarylselenium salts such as triphenylselenium salts, tri-p-tolylselenium salts, tri-o-tolylselenium salts, tris(4-methoxyphenyl) selenium salts, and 1-naphthyldiphenylselenium salts; diarylselenium salts such as diphenylphenacylselenium salts, diphenylbenzylselenium salts, and diphenylmethylselenium salts; monoarylselenium salts such as phenylmethylbenzylselenium salts; and trialkylselenium salts such as dimethylphenacylselenium salts.

Non-limiting examples of the ammonium salts include tetraalkylammonium salts such as tetramethylammonium salts, ethyltrimethylammonium salts, diethyldimethylammonium salts, triethylmethylammonium salts, tetraethylammonium salts, trimethyl-n-propylammonium salts, and trimethyl-n-butylammonium salts; pyrrolidinium salts such as N,N-dimethylpyrrolidinium salts and N-ethyl-N-methylpyrrolidinium salts; imidazolinium salts such as N,N'-dimethylimidazolinium salts and N,N'-diethylimidazolinium salts; tetrahydropyrimidinium salts such as N,N'-dimethyltetrahydropyrimidinium salts and N,N'-diethyltetrahydropyrimidinium salts; morpholinium salts such as N,N-dimethylmorpholinium salts and N,N-diethylmorpholinium salts; piperidinium salts such as N,N-dimethylpiperidinium salts and N,N-diethylpiperidinium salts; pyridinium salts such as N-methylpyridinium salts and N-ethylpyridinium salts; imidazolium salts such as N,N'-dimethylimidazolium salts; quinolium salts such as N-methylquinolium salts; isoquinolium salts such as N-methylisoquinolium salts; thiazolium salts such as benzylbenzothiazolium salts; and acridinium salts such as benzylacridinium salts.

Non-limiting examples of the phosphonium salts include tetraarylphosphonium salts such as tetraphenylphosphonium salts, tetra-p-tolylphosphonium salts, and tetrakis(2-methoxyphenyl) phosphonium salts; triarylphosphonium salts such as triphenylbenzylphosphonium salts; and tetraalkylphosphonium salts such as triethylbenzylphosphonium salts, tributylbenzylphosphonium salts, tetraethylphosphonium salts, tetrabutylphosphonium salts, and triethylphenacylphosphonium salts.

Non-limiting examples of the salts of transition metal complex ions include salts of chromium complex cations such as ($\eta^5$-cyclopentadienyl) ($\eta^6$-toluene)$Cr^+$ and ($\eta^5$-cyclopentadienyl) ($\eta^6$-xylene)$Cr^+$; and salts of iron complex cations such as ($\eta^5$-cyclopentadienyl) ($\eta^6$-toluene)$Fe^+$ and ($\eta^5$-cyclopentadienyl) ($\eta^6$-xylene)$Fe^+$.

Non-limiting examples of the anions constituting the salts include $SbF_6^-$, $PF_6^-$, $BF_4^-$, $(CF_3CF_2)_3PF_3^-$, $(CF_3CF_2CF_2)_3PF_3^-$, $(C_6F_5)_4B^-$, $(C_6F_5)_4Ga^-$, sulfonate anions (such as trifluoromethanesulfonate anion, pentafluoroethanesulfonate anion, nonafluorobutanesulfonate anion, methanesulfonate anion, benzenesulfonate anion, and p-toluenesulfonate anion), $(CF_3SO_2)_3C^-$, $(CF_3SO_2)_2N^-$, perhalogen acid ions, halogenated sulfonate ions, sulfate ions, carbonate ions, aluminate ions, hexafluorobismuthate ions, carboxylate ions, arylborate ions, thiocyanate ions, and nitrate ions.

Non-limiting examples of the cationic thermal initiators include arylsulfonium salts, aryliodonium salts, arene-ion complexes, quaternary ammonium salts, aluminum chelates, and boron trifluoride amine complexes.

Non-limiting examples of the arylsulfonium salts include arylsulfonium hexafluoroantimonate salts. The curable composition may employ any of commercial products available typically under the trade names of SP-66 and SP-77 (each from ADEKA CORPORATION); and the trade names of San-Aid SI-60L, San-Aid SI-80L, San-Aid SI-100L, and San-Aid SI-150L (each from SANSHIN CHEMICAL INDUSTRY CO., LTD.). Non-limiting examples of the aluminum chelates include aluminum ethylacetoacetate diisopropylate and aluminum tris(ethyl acetoacetate). Non-limiting examples of the boron trifluoride amine complexes include boron trifluoride monoethylamine complex, boron trifluoride imidazole complex, and boron trifluoride piperidine complex.

The curable composition may include each of different curing catalysts alone or in combination.

The curable composition may contain the curing catalyst in a content (proportion) of typically 0.01 to 3.0 parts by weight, preferably 0.05 to 3.0 parts by weight, and more preferably 0.1 to 1.0 part by weight, per 100 parts by weight of the cationically curable silicone resin. The curable composition, when containing the curing catalyst in a content of 0.01 part by weight or more, can undergo a curing reaction efficiently and sufficiently and tends to allow the cured product to have surface hardness and adhesiveness at still higher levels. In contrast, the curable composition, when containing the curing catalyst in a content of 3.0 parts by weight or less, tends to have still better storage stability and/or tends to allow the cured product to resist coloring.

The curable composition may further include one or more cationically curable compounds (other cationically curable compounds) than the cationically curable silicone resins and the epoxy compounds. The other cationically curable compounds may be selected from known or common cationically curable compounds and are exemplified typically by vinyl ether compounds.

Other Additives

The curable composition may further include one or more common additives as other optional components. Non-limiting examples of the additives include fillers exemplified typically by inorganic fillers such as precipitated silica, hydrous silica (wet silica), fumed silica, pyrogenic silica, titanium oxide, alumina, glass, quartz, aluminosilicate, iron oxide, zinc oxide, calcium carbonate, carbon black, silicon carbide, silicon nitride, and boron nitride, as well as inorganic fillers resulting from treating these fillers with organosilicon compounds such as organohalosilanes, organoalkoxysilanes, and organosilazanes; fine powders of organic resins such as silicone resins, epoxy resins, and fluorocarbon resins; and conductive powders of metals such as silver and copper. Non-limiting examples of the additives also include curing assistants; solvents such as organic solvents; stabilizers such as antioxidants, ultraviolet absorbers, photostabilizers, thermal stabilizers, and heavy-metal deactivators; flame retardants such as phosphorus flame retardants, halogen flame retardants, and inorganic flame retardants; flame retardant promoters; reinforcers such as other fillers; nucleating agents; coupling agents such as silane coupling agents; lubricants; waxes; plasticizers; release agents; impact modifiers; color modifiers (hue modifiers); clearing agents; rheology adjusters such as flow improvers; workability improvers; colorants such as dyes and pigments; antistatic agents; dispersants; surface modifiers such as slipping agents; delustering agents; antifoaming agents; foam inhibitors; defoaming agents; antimicrobial agents; antiseptic agents; viscosity modifiers; thickeners; photosensitizers; and blowing agents. The curable composition may include each of different additives alone or in combination.

Curable Composition Production Method

The curable composition may be prepared typically, but non-limitingly, by stirring and mixing the components at room temperature, or with heating as needed. The curable composition is usable as a one-part composition, or a multi-part (such as two-part) composition. The one-part composition contains the components, which have been blended beforehand, and is used as intact. In contrast, in the multi-part composition, two or more parts (portions) of the components are stored separately, and the two or more parts are blended in predetermined proportions before use.

The curable composition is preferably, but non-limitingly, liquid at room temperature (about 25° C.). More specifically, the curable composition may have a viscosity of typically 300 to 20000 mPa·s, preferably 500 to 10000 mPa·s, and more preferably 1000 to 8000 mPa·s, as determined at 25° C. in terms of a liquid resulting from diluting the curable composition with a solvent so as to have a solvent proportion of 20% (in particular, in terms of a curable composition (solution) resulting from diluting the curable composition with methyl isobutyl ketone so as to have a methyl isobutyl ketone proportion of 20 weight percent). The curable composition, when having a viscosity as above of 300 mPa·s or more, tends to allow the cured product to have still better heat resistance. In contrast, the curable composition, when having a viscosity of 20000 mPa·s or less, tends to be prepared and handled more easily and tends to impede bubbles from remaining in the cured product. The viscosity of the curable composition may be measured using a viscometer MCR 301 (trade name, supplied by Anton Paar GmbH) at an oscillation angle of 5%, a frequency of 0.1 to 100 $s^{-1}$, and a temperature of 25° C.

Cured Product

The curable composition can be cured and yield a cured product by allowing polymerization reaction of cationically curable compounds in the curable composition to proceed. The curing technique may be selected as appropriate from well-known techniques such as the application of actinic radiation and/or heat. The actinic radiation for use herein may be any actinic radiation such as infrared rays, visible light, ultraviolet rays, X rays, electron beams, alpha rays, beta rays, and gamma rays. Among them, ultraviolet rays are preferred because of their satisfactory handleability.

Assume that the curable composition is cured by the application of actinic radiation. In this case, the conditions, such as actinic radiation application conditions, may be adjusted as appropriate according typically to the type and energy of the actinic radiation to be applied, and the shape and size of the cured product. For example, ultraviolet rays, when employed, may be applied typically at about 1 to about 10000 $mJ/cm^2$, and preferably at 50 to 10000 $mJ/cm^2$. The application of the actinic radiation may be performed using, for example, any of high-pressure mercury lamps, ultra-high pressure mercury lamps, xenon lamps, carbon arc, metal halide lamps, sunlight, LED lamps, and laser. After the actinic radiation application, the work may be further subjected to a heat treatment (annealing, aging) to allow the curing reaction to further proceed.

In contrast, assume that the curable composition is cured by the application of heat (by heating). In this case, the curing may be performed at a temperature of typically 30° C. to 200° C., and preferably 50° C. to 190° C., for a curing time settable as appropriate.

The curable composition, when cured as described above, can form a cured product that has surface hardness and heat resistance at high levels and offers flexibility and workability at excellent levels. In particular, the curable composition is especially preferably usable as a "curable composition for hardcoat layer formation" to form a hardcoat layer in a hardcoat film. The curable composition for hardcoat layer formation is also referred to typically as a "hardcoating composition" or a "hardcoating agent". Assume that the curable composition is used as a curable composition for hardcoat layer formation to form a hardcoat layer. A hardcoat film including the resulting hardcoat layer has flexibility, can be produced and processed through a roll-to-roll process, and still maintains high hardness and good heat resistance.

Substrate Layer

The substrate for use in the substrate layer of the shaped article according to the present invention may be selected from known or common substrates (base materials). Non-limiting examples of the such substrates include plastic substrates, metal substrates, ceramic substrates, semiconductor substrates, glass substrates, paper substrates, wood substrates (wooden substrates), and substrates having a coated surface. Among them, the substrate is preferably a plastic substrate (a substrate made from a plastic material).

Non-limiting examples of the plastic material or materials to form the plastic substrate include polyesters such as poly(ethylene terephthalate)s (PETS) and poly(ethylene naphthalate)s (PENs); polyimides; polycarbonates; polyamides; polyacetals; poly(phenylene oxide)s; poly(phenylene sulfide)s; polyethersulfones; poly(ether ether ketone)s; cyclic polyolefins exemplified typically by homopolymers of norbornene monomers (where the homopolymers are exemplified typically by addition polymers and ring-opened polymers), copolymers between norbornene monomers and olefinic monomers, such as norbornene-ethylene copolymers (where the copolymers are exemplified typically by cyclic olefin copolymers such as addition polymers and ring-opened polymers), and derivatives of them; vinyl polymers exemplified typically by poly(methyl methacrylate)s (PMMAs) and other acrylic resins, polystyrenes, poly(vinyl chloride)s, and acrylonitrile-styrene-butadiene resins (ABS resins); vinylidene polymers such as poly(vinylidene chloride)s; cellulosic resins such as triacetyl cellulose (TAC); epoxy resins; phenolic resins; melamine resins; urea resins; maleimide resins; silicones; and any other plastic materials. The plastic substrate may include (be made from) each of different plastic materials alone or in combination.

In particular to give a highly transparent hardcoat film as the hardcoat film, the plastic substrate for use herein is preferably selected from substrates having excellent transparency (transparent substrates) and more preferably selected from polyester (in particular, PETs and PENs) films, cyclic polyolefin films, polycarbonate films, TAC films, and PMMA films.

The plastic substrate may include additives as needed. Non-limiting examples of the additives include antioxidants, ultraviolet absorbers, photostabilizers, thermal stabilizers, crystal nucleators, flame retardants, flame retardant promoters, fillers, plasticizers, impact modifiers, reinforcers, dispersants, antistatic agents, blowing agents, antimicrobial agents, and any other additives. The plastic substrate may include each of different additives alone or in combination.

The plastic substrate may have a single-layer structure or a multilayer (laminated) structure and is not limited in its configuration (structure). The plastic substrate may be a plastic substrate having a multilayer structure and including a plastic film and a layer disposed on or over at least one side of the plastic film, where the layer is a layer other than the hardcoat layer and is also referred to as "other layer". For example, the plastic substrate may include the plastic film and the other layer disposed on each other, or may include the other layer, the plastic film, and the other layer disposed in the specified sequence. Non-limiting examples of the other layer include hardcoat layers other than the hardcoat layer. Non-limiting examples of materials to form the other layer include the plastic materials.

The plastic substrate may have undergone one or more known or common surface treatments partially or entirely on its surface. Non-limiting examples of the surface treatments include roughening treatment, adhesion facilitating treatment, antistatic treatment, sand blasting (sand matting), corona discharge treatment, plasma treatment, chemical etching, water matting, flame treatment, acid treatment, alkaline treatment, oxidation, ultraviolet irradiation treatment, and silane coupling agent treatment. The plastic substrate may be an unoriented film or an oriented film (such as an uniaxially oriented film or biaxially oriented film).

The substrate may have a thickness which is selectable as appropriate in the range of typically 0.01 to 10000 µm, preferably 1 µm or more (e.g., 1 to 10000 µm), more preferably 20 to 10000 µm, and furthermore preferably 50 to 1000 µm. The substrate, when being a transparent substrate, may have a thickness of typically 1 to 300 µm, preferably 20 to 250 µm, more preferably 40 to 200 µm, and furthermore preferably 50 to 150 µm.

The shaped article may have a surface-protecting film on the hardcoat layer. The shaped article according to the present invention, when having such a surface-protecting film, tends to have still better die cutting workability. For example, assume that the hardcoat layer has very high hardness and is susceptible to defects in die cutting, such as separation from the substrate and cracking. Even in this case, the shaped article, when having the surface-protecting film, can undergo die cutting using a Thomson blade without causing these defects.

The surface-protecting film for use herein may be selected from known or common surface-protecting films and may be one including a plastic film and a pressure-sensitive adhesive layer disposed on the plastic film. Non-limiting examples of the plastic film include plastic films made from plastic materials, where the plastic materials are exemplified typically by polyesters such as poly(ethylene terephthalate)s and poly(ethylene naphthalate)s; polyolefins such as polyethylenes, polypropylenes, and cyclic polyolefins; polystyrenes; acrylic resins; polycarbonates; epoxy resins; fluorocarbon resins; silicone resins; diacetate resins; triacetate resins; polyarylates; poly(vinyl chloride)s; polysulfones; polyethersulfones; poly(ether ether imide)s; polyimides; and polyamides. Non-limiting examples of the pressure-sensitive adhesive layer include pressure-sensitive adhesive layers each made from one or more known or common pressure-sensitive adhesives, where the pressure-sensitive adhesives are exemplified typically by acrylic pressure-sensitive adhesives, natural rubber pressure-sensitive adhesives, synthetic rubber pressure-sensitive adhesives, ethylene-vinyl acetate copolymer pressure-sensitive adhesives, ethylene-(meth)acrylic ester copolymer pressure-sensitive adhesives, styrene-isoprene block copolymer pressure-sensitive adhesives, and styrene-butadiene block copolymer pressure-sensitive adhesives. The pressure-sensitive adhesive layer may include one or more additives such as antistatic agents and slipping agents. The plastic film and the pressure-sensitive adhesive layer may each independently have a single-layer structure or a multilayer (layered) structure. The thickness of the surface-protecting film is not limited and selectable as appropriate.

The surface-protecting film for use herein may be selected from commercial products available in the market, typically under the trade names of SUNYTECT series (from Sun A. Kaken Co., Ltd.), the trade names of E-MASK series (from Nitto Denko Corporation), the trade names of MASTACK series (from Fujimori Kogyo Co., Ltd.), the trade names of HITALEX series (from Hitachi Chemical Company, Ltd.), and the trade names of ALPHAN series (from Oji F-Tex Co., Ltd.).

Thermoplastic Resin Layer

Non-limiting examples of a thermoplastic resin or resins to constitute the thermoplastic resin layer in the shaped article according to the present invention include olefinic resins, vinyl polymers (addition polymers), polyester resins, polyamide resins, polycarbonate resins, polyurethane resins, poly(phenylene oxide) resins, poly(phenylene sulfide) resins, polysulfone resins, cellulosic derivatives, and polyimide resins. Of these thermoplastic resins, preferred are olefinic resins, vinyl polymers (such as styrenic resins, (meth)acrylic resins, polyacrylonitrile resins, vinyl chloride resins, and vinyl alcohol resins), and polyester resins. These are preferred in view typically of formability and mechanical properties. The thermoplastic resin layer may include (be made from) each of different thermoplastic resins alone or in combination. Non-limiting examples of preferred embodiments of the thermoplastic resin layer include thermoplastic resin sheets in the form of sheet; and thermoplastic resin shaped articles resulting from shaping the thermoplastic resins typically by injection molding.

The olefinic resins may be exemplified typically by homo- or co-polymers of olefins. Non-limiting examples of the olefins include $C_2$-$C_{10}$ α-olefins such as ethylene, propylene, 1-butene, isobutene, 4-methyl-1-butene, 1-pentene, 3-methyl-1-pentene, 1-hexene, and 1-octene.

Specific, but non-limiting examples of the styrenic resins include polystyrenes (GPPSs), styrene-acrylonitrile copolymers (AS resins), styrene-methyl methacrylate copolymers (MS resins), acrylonitrile-styrene-methyl methacrylate copolymers, styrene-maleic anhydride copolymers (SMA resins), high-impact polystyrenes (HIPS), styrene-acrylonitrile-butadiene copolymers (ABS resins), α-methylstyrene-modified ABS resins, imide-modified ABS resins, and styrene-methyl methacrylate-butadiene copolymers (MBS resins).

Non-limiting examples of the (meth)acrylic resins include (meth)acrylic $C_1$-$C_8$ alkyl esters such as methyl (meth)acrylate, ethyl (meth)acrylate, butyl (meth)acrylate, and hexyl (meth)acrylate; and (meth)acrylic hydroxy-$C_2$-$C_8$ alkyl esters such as 2-hydroxyethyl (meth)acrylate and 2-hydroxypropyl (meth)acrylate.

Non-limiting examples of the vinyl chloride resins include poly(vinyl chloride)s, vinyl chloride-vinylidene chloride copolymers, vinyl chloride-vinyl acetate copolymers, vinyl chloride-$C_2$-$C_4$ olefin copolymers (such as vinyl chloride-ethylene copolymers and vinyl chloride-propylene copolymers), vinyl chloride-(meth)acrylic ester copolymers (such as vinyl chloride-methyl methacrylate), and vinyl chloride-acrylonitrile copolymers.

Non-limiting examples of the vinyl alcohol resins include poly(vinyl alcohol)s and ethylene-vinyl alcohol copolymers.

Non-limiting examples of the polyester resins include poly-($C_2$-$C_4$ alkylene-$C_6$-$C_{10}$ arylate) resins each including a $C_2$-$C_4$ alkylene-$C_6$-$C_{10}$ arylate unit, such as poly(ethylene terephthalate)s (PETs), poly(trimethylene terephthalate)s (PTTs), poly(butylene terephthalate)s (PBTs), and poly(ethylene naphthalate)s (PENs); and poly-(1,4-cyclohexanedimethyl terephthalate)s (PCTs).

These thermoplastic resins may also be derived from monomers further including one or more copolymerizable monomers (co-monomers). Non-limiting examples of the copolymerizable monomers include unsaturated polycarboxylic acids and acid anhydrides of them, such as maleic acid, itaconic acid, citraconic acid, and acid anhydrides of them; imide monomers including maleimide, and N-substituted maleimides exemplified typically by N-alkylmaleimides (such as N—$C_1$-$C_4$ alkylmaleimides), N-cycloalkylmaleimides (such as N-cyclohexylmaleimide), and N-arylmaleimides (such as N-phenylmaleimide); and vinyl cyanide monomers such as (meth)acrylonitrile. The thermoplastic resins may be derived from monomers including each of different copolymerizable monomers alone or in combination.

The thermoplastic resin layer may be made from one or more thermoplastic resins alone, or in combination with one or more other materials as a mixture. Non-limiting examples of the other materials include resins other than thermoplastic resins, such as thermosetting resins; other organic substances such as rubber; and inorganic substances such as metals. The thermoplastic resin layer may include the thermoplastic resin in a proportion of typically 50 weight percent or more, preferably 70 weight percent or more, and more preferably 90 weight percent or more.

The thermoplastic resin layer may have a single-layer structure or a multilayer (laminated) structure and is not limited in its configuration (structure).

The thermoplastic resin layer may have undergone one or more known or common surface treatments partially or entirely on its surface. Non-limiting examples of the surface treatments include roughening treatment, adhesion facilitating treatment, antistatic treatment, sand blasting (sand matting), corona discharge treatment, plasma treatment, chemical etching, water matting, flame treatment, acid treatment, alkaline treatment, oxidation, ultraviolet irradiation treatment, and silane coupling agent treatment. The thermoplastic resin layer, when being in sheet form, may be an unoriented sheet or oriented sheet.

The thermoplastic resin layer may have a thickness selectable as appropriate in the range of typically 0.1 to 10000 μm, preferably 1 to 1000 μm, more preferably 10 to 500 μm, and furthermore preferably 20 to 300 μm. The thermoplastic resin layer, if having a thickness of less than 0.1 μm, may be easily broken by heating; and, if having a thickness of greater than 10000 μm, may cause the shaped article to resist processing into an article having a curved shape.

The thermoplastic resin layer has a melting point of typically 100° C. to 1000° C., preferably 150° C. to 500° C., more preferably 180° C. to 400° C., and furthermore preferably 200° C. to 350° C. The thermoplastic resin layer, if having a melting point of lower than 100° C., may cause the shaped article to have inferior heat resistance; and, if having a melting point of higher than 1000° C., may cause the shaped article to resist processing into an article having a curved shape.

The thermoplastic resin layer may also be made from one or more thermoplastic resin commercial products available typically under the trade name of CEVIAN V (ABS, from Daicel Polymer Ltd.), CLEAPACT (styrenic resin, from DIC Corporation), Toyo AS (acrylonitrile-styrene (AS), from Toyo Styrene Co., Ltd.), ACETY (cellulose acetate resin, from Daicel FineChem Ltd.), Evatate (EVA, from Sumitomo Chemical Co., Ltd.), ARLEN (modified polyamide 6T (PA), from Mitsui Chemicals Inc.), UBE NYLON (nylon resin (PA), from Ube Industries, Ltd.), DURANEX (PBT, from WinTech Polymer Ltd.), Panlite (PC, from Teijin Chemicals Ltd.), NOVAPEX (PET, from Mitsubishi Chemical Corporation), AURUM (polyimide resin (PI), from Mitsui Chemicals Inc.), ACRYPET (PMMA, from Mitsubishi Rayon Co., Ltd.), TPX (polymethylpentene, from Mitsui Chemicals Inc.), DURACON (polyoxymethylene (POM), from Polyplastics Co., Ltd.), Prime Polypro (PP, from Prime Polymer Co., Ltd.), ZYLON (modified polyphenylene ether (modified PPE), from Asahi Kasei Chemicals Corporation), DURAFIDE (PPS, from Polyplastics Co., Ltd.), CLEAREN (special styrenic clear (SBC) resin, from DENKI KAGAKU KOGYO KABUSHIKI KAISHA), Toyo Styrene (PS, from Toyo Styrene Co., Ltd.), Sumiflex (PVC, from Mitsubishi Chemical Corporation), KURAMIRON U (polyester thermoplastic polyurethane (TPU), from Kuraray Co. Ltd.), TOPAS (cyclic olefin copolymer (COC), from Polyplastics Co., Ltd.), Asaflex (high-performance styrenic clear resin, from Asahi Kasei Chemicals Corporation), and Ecoflex (biodegradable plastic, from BASF Japan Ltd.). The thermoplastic resin layer (sheet) for use herein may be one resulting from processing any of the commercially available thermoplastic resins into a sheet (sheet-like article) by a known or common procedure.

The thermoplastic resin layer for use herein may also be selected from commercially available thermoplastic resin sheets. Non-limiting examples of the commercially available thermoplastic resin sheets include products under the trade name of NOA CRYSTAL (A-PET, from PR TOPLA Ltd.), Clearne (polypropylene sheet (PP), from Sheedom Co., Ltd.), ACRYPLEN (PMMA sheet, from Mitsubishi Rayon Co., Ltd.), and S-VIRON Sheet (PVC sheet, from Sekisui Seikei, Ltd.).

Shaped Article Production Method

The shaped article according to the present invention may be produced typically, but non-limitingly, by a method including steps (A), (B), and (C) below. The shaped article according to the present invention may also be produced by a production method including a step other than the steps (A), (B), and (C), where a non-limiting example of the other step is the step of providing an anchoring layer and/or a pressure-sensitive adhesive layer. In particular, the shaped article according to the present invention is preferably produced by a method including the steps (A), (B), and (C) in the specified sequence (integral forming); or by a method including the steps (A), (C), and (B) in the specified sequence (posterior lamination).

The step (A) is a hardcoat layer forming step of forming a hardcoat layer on a substrate layer.

The step (B) is a laminating step of laminating the substrate layer and a thermoplastic resin layer on each other.

The step (C) is a shaping step of shaping a shaped article into a desired curved shape.

Hardcoat Layer Forming Step (A)

The hardcoat layer forming step is the step of forming a hardcoat layer on a substrate layer to give a substrate-borne hardcoat film. The hardcoat layer may be formed (produced) in accordance with any of known or common hardcoat film production methods without limitation. For example, the hardcoat layer may be formed typically by applying the curable composition (curable composition for hardcoat layer formation) to at least one side of the substrate, drying the applied composition as needed to remove the solvent, and curing the curable composition (curable composition layer). The curable composition can be cured under any conditions which are not limited and selectable as appropriate from the conditions for the formation of the cured product. The substrate-borne hardcoat film may also be a substrate-borne hardcoat sheet.

In particular, the shaped article according to the present invention can be produced through a roll-to-roll process. This is because the hardcoat layer is a hardcoat layer formed from the curable composition (curable composition for hardcoat layer formation) which can form a cured product having flexibility and workability at excellent levels. The shaped article according to the present invention, when produced through a roll-to-roll process, can be produced with significantly higher productivity. The production method for use herein may be selected from known or common roll-to-roll production methods, such as a method that includes the following steps as essential steps and successively performs the steps. The steps are: the step of unwinding a rolled, wound substrate and feeding the unwound substrate; the step of applying the curable composition (curable composition for hardcoat layer formation) to at least one side of the fed substrate, subsequently drying the applied composition as needed to remove the solvent, and curing the curable composition (curable composition layer) to form a hardcoat layer to thereby give a substrate-borne hardcoat film; and the subsequent step of rewinding the substrate-borne hardcoat film into a roll. The method may further include one or more steps in addition to these steps.

The curing to form the hardcoat layer does not always have to be performed in one stage. For example, the curing may be performed by reacting part of the curable composition into an incompletely cured (partially cured) stage (B-staging), and thoroughly curing the curable composition after any of the steps (A), (B), and (C) (in particular, after the shaping step). The curing of the curable composition, particularly when performed in two stages as above, can eliminate or minimize cracking or fracture of the hardcoat layer in the shaping step.

Exemplary processes for forming the hardcoat layer include not only the roll-to-roll process, but also spray coating. The spray coating is a process typically of applying the curable composition (curable composition for hardcoat layer formation) to one side of the substrate layer by a known or common spraying technique, drying the applied composition as needed to remove the solvent, and curing the curable composition (curable composition layer). In particular, the spray coating, when being performed to a curved surface of the article after the shaping step, can eliminate or minimize cracking of the hardcoat layer and is effective. It is also acceptable that a hardcoat layer is once formed typically through a roll-to-roll process, and another hardcoat layer is further formed on the formed hardcoat layer by spray coating after the shaping step.

Laminating Step (B)

The laminating step is the step of laminating the substrate-borne hardcoat film (substrate side) and a thermoplastic resin layer, as illustrated in FIG. 2. This step may be performed by any known or common laminating technique. The laminating is performed preferably, but non-limitingly, by a heat-pressing technique of heating one or both of the substrate and the thermoplastic resin layer, and applying pressure to these layers to laminate them, because this technique enables easy lamination with good productivity. The heat pressing may be performed by a sheet-to-sheet process or a roll-to-roll process. The heating temperature has only to be a temperature equal to or higher than the melting point of the substrate and/or the thermoplastic resin, but is typically 100° C. to 500° C., and preferably 150° C. to 300° C. The pressure is typically 0.1 to 100 Pa, and preferably 1 to 50 Pa. The laminating step may be performed not only by the heat pressing, but also by a process using a pressure-sensitive adhesive. The pressure-sensitive adhesive for use herein may be selected from known or common pressure-sensitive adhesives such as acrylic pressure-sensitive adhesives and silicon pressure-sensitive adhesives.

Shaping Step (C)

The shaping step is the step of shaping the work into a desired curved shape and may be performed by any known or common shaping technique not limited. Non-limiting examples of the shaping technique include shaping techniques using molds, such as vacuum forming and injection molding. Among them, vacuum forming is preferred, because this technique enables easy shaping.

The vacuum forming is a technique in which an article (sheet-like article) to be shaped is placed on a mold made from a material such as a metal and having a desired curved shape, the article to be shaped is heated, and then vacuuming is performed to conform the article to the mold's shape. The vacuum forming may be performed using a commercially available vacuum forming machine (such as Pressure and Vacuum Thermoforming Machine FK-0431-10, supplied by Asano Laboratories Co., Ltd.). The heating temperature may vary depending typically on the substrate to be used, is not limited, but is typically about 100° C. to about 300° C.

The integral forming method for producing the target article through the steps (A), (B), and (C) performed in the specified sequence may be performed in the following manner. A substrate-borne hardcoat film is prepared in the hardcoat layer forming step (A). A thermoplastic resin layer is laminated on the substrate side of the substrate-borne hardcoat film in the laminating step (B), as illustrated in (B-1) in FIG. 2. The resulting article is shaped into a desired curved shape in the shaping step (C). This integral forming is effective particularly when the thermoplastic resin layer is in sheet form, enables most steps to be performed through a roll-to-roll process, and excels particularly in productivity.

The posterior lamination method for producing the target article through the steps (A), (C), and (B) performed in the specified sequence is performed in the following manner. A substrate-borne hardcoat film is prepared in the hardcoat layer forming step (A). The substrate-borne hardcoat film is shaped into a desired curved shape in the shaping step (C). A thermoplastic resin layer is laminated on the substrate side of the shaped substrate-borne hardcoat film in the laminating step (B), as illustrated in (B-2) in FIG. 2. In the shaping step (C) in this method, it is preferred that not only the substrate-borne hardcoat film is shaped, but also the thermoplastic resin layer is separately shaped typically by injection molding or vacuum forming into a formed article having a shape that conforms to the shape of the substrate-borne hardcoat film. This posterior lamination is effective particularly when the thermoplastic resin layer has a large thickness and is hardly shaped by the integral forming.

The shaped article according to the present invention has flexibility, can be produced and processed through a roll-to-roll process, and still maintains high hardness and good heat resistance. The shaped article therefore has high quality and offers excellent productivity. The shaped article according to the present invention is preferably usable in or for various products exemplified typically by display devices such as liquid crystal displays and organic electroluminescent displays; input devices such as touch screens; solar cells; various household electrical appliances; various electric/electronic products; various electric/electronic products exemplified typically by portable electronic terminals such as game equipment, personal computers, tablet computers, smartphones, and cellular phones; and various optical devices. In embodiments, the shaped article according to the present invention is used as components of such various products, or of members or parts of the products. In a non-limiting example of the embodiments, the shaped article is used typically as or for a multilayer assembly including a hardcoat film and a transparent conductive film in a touch screen.

EXAMPLES

The present invention will be illustrated in further detail with reference to several examples below. It should be noted, however, that the examples are by no means intended to limit the scope of the present invention. The molecular weights of products were measured using Alliance HPLC System 2695 (supplied by Waters Corporation), Refractive Index Detector 2414 (supplied by Waters Corporation), two Tskgel GMH$_{HR}$-M columns (supplied by Tosoh Corporation) as columns, Tskgel guard column H$_{HR}$L (supplied by Tosoh Corporation) as a guard column, COLUMN HEATER U-620 (supplied by Sugai) as a column oven, and THF as a solvent, at a measurement temperature of 40° C., with calibration with a polystyrene standard. The T3 to T2 mole ratios, which are mole ratios of T3 species to T2 species, of the products were determined by $^{29}$Si-NMR spectrum measurements using JEOL ECA 500 (500 MHz). The 5% weight loss temperatures ($T_{d5}$) of the products were measured by thermogravimetry (TGA) in an air atmosphere at a rate of temperature rise of 5° C./min. In Table 1, the formulae (proportions) are expressed in part by weight.

Example 1

Preparation of Cationically Curable Silicone Resin

In a nitrogen stream, 161.5 mmol (39.79 g) of 2-(3,4-epoxycyclohexyl)ethyltrimethoxysilane (hereinafter referred to as "EMS"), 9 mmol (1.69 g) of phenyltrimethoxysilane (hereinafter referred to as "PMS"), and 165.9 g of acetone were placed in a 300-mL flask (reactor) equipped with a thermometer, a stirrer, a reflux condenser, and a nitrogen inlet tube, followed by temperature rise up to 50° C. The mixture was combined with 4.70 g (1.7 mmol in terms of potassium carbonate) of 5% potassium carbonate aqueous solution added dropwise over 5 minutes, and subsequently combined with 1700 mmol (30.60 g) of water added dropwise over 20 minutes. Significant temperature rise did not occur during the dropwise additions. The mixture was then subjected to polycondensation in a nitrogen stream for 4 hours, while the temperature was held at 50° C.

A product in the reaction solution after the polycondensation was analyzed and found to have a number-average molecular weight of 1911 and a molecular-weight dispersity of 1.47. The product had a T3 to T2 mole ratio of 10.3, where the T3 to T2 mole ratio is the mole ratio of T3 species to T2 species and was calculated from the $^{29}$Si-NMR spectrum of the product. The product was subjected to FT-IR spectrum measurement by the method and was found to give one intrinsic absorption peak at around 1100 cm$^{-1}$.

The reaction solution was then cooled and rinsed until a lower liquid became neutral, an upper liquid was isolated, from which the solvent was distilled off at 40° C. and 1 mmHg. This gave a colorless, transparent, liquid product (cationically curable silicone resin including epoxy-containing silsesquioxane units; curable resin A). The product had a $T_{d5}$ of 370° C.

Production of Hardcoat Film

A solution mixture was prepared and used as a hardcoating composition (curable composition). The solution mixture was a mixture of 5.0 parts by weight of the prepared curable resin A, 0.1 part by weight of a curing catalyst, and 0.05 part by weight of a leveling agent.

The prepared hardcoating composition was applied onto a PET film using a wire bar #30, left stand (prebaked) in an oven at 70° C. for 1 minute, and then irradiated with an ultraviolet ray at a dose of 400 mJ/cm$^2$ for 5 seconds using a high-pressure mercury lamp (supplied by Eye Graphics Co., Ltd.). The resulting article was subjected to a heat treatment (aging treatment) at 15° C. for one hour to cure the coat layer of the hardcoating composition and yielded a substrate-borne hardcoat film.

Production of Shaped Article

A thermoplastic resin (PMMA) sheet (trade name ACRYPLEN, supplied by Mitsubishi Rayon Co., Ltd., having a thickness of 200 μm) as a thermoplastic resin layer was heat-pressed to the substrate layer side of the prepared substrate-borne hardcoat film at a temperature of 110° C. under a load of 2.5 kg/cm$^2$ to integrate the substrate-borne hardcoat film and the thermoplastic resin sheet with each other. The integrated sheet (250 mm by 250 mm) was preheated in a vacuum forming machine (Pressure and Vacuum Thermoforming Machine FK-0431-10, supplied by Asano Laboratories Co., Ltd.) up to a sheet temperature of 150° C. The preheated sheet was moved and placed over a vacuum forming mold so that the hardcoat layer faced up, and the inside of the mold was evacuated, where the mold is an aluminum mold having a convexly curved shape. This gave a shaped article having a curved shape.

Examples 2 to 5

In Examples 2 to 5, substrate-borne hardcoat films and shaped articles were produced by procedures similar to those in Example 1, except for employing different proportions of curable resins, and adding 0.5 part by weight of an epoxy compound in the preparation of mixtures (compositions), as indicated in Table 1. The polyorganosilsesquioxanes in the compositions obtained in Examples 2 to 5 were subjected to FT-IR spectrum measurement by the method and were found to each give one intrinsic absorption peak at around 1100 cm$^{-1}$. The hardcoat layers had thicknesses as indicated in Table 1.

Example 6

Preparation of Cationically Curable Silicone Resin

In a nitrogen stream, 161.5 mmol (39.79 g) of EMS, 9 mmol (1.69 g) of PMS, and 165.9 g of acetone were placed in a 300-mL flask (reactor) equipped with a thermometer, a stirrer, a reflux condenser, and a nitrogen inlet tube, followed by temperature rise up to 50° C. The mixture was combined with 4.70 g (1.7 mmol in terms of potassium carbonate) of 5% potassium carbonate aqueous solution added dropwise over 5 minutes, and then combined with 1700 mmol (30.60 g) of water added dropwise over 20 minutes. Significant temperature rise did not occur during dropwise additions. The mixture was then subjected to polycondensation in a nitrogen stream for 4 hours, while the temperature was held at 50° C.

A product in the reaction solution after the polycondensation was analyzed and found to have a number-average molecular weight of 1799 and a molecular-weight dispersity of 1.57. The product had a T3 to T2 mole ratio of 10.1, where the T3 to T2 mole ratio is the mole ratio of T3 species to T2 species and was calculated from the $^{29}$Si-NMR spectrum of the product. The product was subjected to FT-IR spectrum measurement by the method and was found to give one intrinsic absorption peak at around 1100 cm$^{-1}$.

The reaction solution was then cooled and rinsed until a lower liquid became neutral, an upper liquid was isolated, from which the solvent was distilled off at 40° C. and 1 mmHg. This gave a colorless, transparent, liquid product (cationically curable silicone resin including epoxy-containing silsesquioxane units; a curable resin B). The product had a $T_{d5}$ of 370° C.

Production of Hardcoat Film

A solution mixture was prepared and used as a hardcoating composition (curable composition). The solution mixture was a mixture of 4.5 parts by weight of the prepared curable resin B, 0.5 part by weight of an epoxy compound, 0.05 part by weight of a curing catalyst, and 0.05 part by weight of a leveling agent. Using the prepared hardcoating composition, a substrate-borne hardcoat film was produced, and a shaped article was produced by procedures similar to those in Example 1.

Examples 7 and 8

Hardcoating compositions were prepared, and shaped articles were produced by procedures similar to those in Example 6, except for employing different formulae of the hardcoating compositions (curable compositions) and different thicknesses of the hardcoat layers as indicated in Table 1.

Comparative Examples 1 to 4

Hardcoat films were prepared, and shaped articles were produced by procedures similar to those in Example 1, except for preparing mixtures (compositions) by using the curable resins given in Table 1 without using the leveling agent.

Pencil Hardness (Surface Hardness)

The hardcoat layer surface pencil hardness (surface hardness) of the above-produced shaped articles was evaluated in accordance with JIS K 5600-5-4. Results of this evaluation are presented in Table 1. The evaluation was performed three times, and the hardest (highest) result was defined as the evaluation result.

Bend (Flexibility)

The bend (flexibility) of the above-produced hardcoat films was evaluated in accordance with JIS K 5600-5-1, using cylindrical mandrels. Results of this evaluation are presented in Table 1.

TABLE 1

| | | Example 1 | Example 2 | Example 3 | Example 4 | Example 5 | Example 6 | Example 7 | Example 8 | Comp. Ex. 1 | Comp. Ex. 2 | Comp. Ex. 3 | Comp. Ex. 4 |
|---|---|---|---|---|---|---|---|---|---|---|---|---|---|
| Weight ratio of curable resin to epoxy compound | | 100:0 | 90:10 | 90:10 | 90:10 | 90:10 | 90:10 | 80:20 | 70:30 | 100:0 | 100:0 | 100:0 | 100:0 |
| Curable resin | Curable resin A | 5 | 4.5 | 4.5 | 4.5 | 4.5 | | | | | | | |
| | Curable resin B | | | | | | 4.5 | 4 | 3.5 | | | | |
| | PETIA | | | | | | | | | 5 | | | |
| | IRR214K | | | | | | | | | | 5 | | |
| | TA-100 | | | | | | | | | | | 5 | |
| | SI-20 | | | | | | | | | | | | 5 |
| Epoxy compound | CELLOXIDE 2021P | | 0.5 | | | | 0.5 | 1 | 1.5 | | | | |
| | Epoxy compound A | | | 0.5 | | | | | | | | | |
| | EHPE 3150 | | | | 0.5 | | | | | | | | |
| | Epoxy compound B | | | | | 0.5 | | | | | | | |
| Solvent | MEK | | 1.3 | | | | | | | | | | |
| Curing catalyst | WPI-124 | 0.1 | 0.1 | 0.1 | 0.1 | 0.1 | 0.05 | 0.05 | 0.05 | | | | |
| | Curing catalyst A | | | | | | | | | | | 0.3 | 0.3 |
| | Irgacure 184 | | | | | | | | | 0.5 | 0.5 | | |
| Leveling agent | Surflon S-243 | 0.05 | 0.05 | 0.05 | 0.05 | 0.05 | 0.05 | 0.05 | 0.05 | | | | |
| Hardcoat layer thickness (μm) | | 51 | 49 | 56 | 50 | 50 | 32 | 34 | 37 | 35 | 32 | 40 | 37 |
| Evaluations | Bend (mm) | 32 | 20 | 20 | 16 | 20 | 16 | 16 | 20 | ≥32 | ≥32 | ≥32 | ≥32 |
| | Pencil hardness | 4H | 9H | 8H | 8H | 9H | 8H | 8H | 8H | 3H | H | 2H | 2H |

The abbreviations given in Table 1 are as follows:
Curable Resins
PETIA: a mixture of pentaerythritol triacrylate and pentaerythritol tetraacrylate, trade name PETIA (supplied by DAICEL-ALLNEX LTD.)
IRR 214K: tricyclodecanedimethanol diacrylate, trade name IRR 214K (supplied by DAICEL-ALLNEX LTD.)
TA-100: an acrylic silicone resin, trade name SQ TA-100 (supplied by Toagosei Co. Ltd.)
SI-20: an acrylic silicone resin, trade name SQ SI-20 (supplied by Toagosei Co. Ltd.)
Epoxy Compounds
CELLOXIDE 2021P: 3,4-epoxycyclohexylmethyl (3,4-epoxy)cyclohexane carboxylate, trade name CELLOXIDE 2021P (supplied by Daicel Corporation)
Epoxy compound A: bis(3,4-epoxycyclohexylmethyl) ether
EHPE 3150: an 1,2-epoxy-4-(2-oxiranyl)cyclohexane adduct of 2,2-bis(hydroxymethyl)-1-butanol, trade name EHPE 3150 (supplied by Daicel Corporation)
Epoxy compound B: 2,2-bis(3,4-epoxycyclohexylmethyl) propane
Solvent
MEK: methyl ethyl ketone
Curing Catalysts
WPI-124: trade name WPI-124 (supplied by Wako Pure Chemical Industries, Ltd., a 50% solution of a photoacid generator)
Curing Catalyst A: a 50% solution of [4-(4-biphenylthio) phenyl]-4-biphenylphenylsulfonium tris(pentafluoroethyl) trifluorophosphate in propylene glycol methyl ether acetate
Irgacure 184: a photoinitiator, trade name IRGACURE 184 (supplied by BASF Japan Ltd.)
Leveling Agent
Surflon S-243: an ethylene oxide adduct of a fluorine compound, trade name Surflon S-243 (supplied by AGC Seimi Chemical Co., Ltd.)

INDUSTRIAL APPLICABILITY

The shaped article according to the present invention has flexibility and surface hardness at high levels, offers heat resistance and workability at excellent levels, and is applicable typically as glass alternatives to hardcoat films.

REFERENCE SIGNS LIST 1 shaped article
2 hardcoat layer
3 substrate layer
4 thermoplastic resin layer
5 substrate-borne hardcoat film

The invention claimed is:
1. A shaped article comprising:
a hardcoat layer;
a substrate layer; and
a thermoplastic resin layer,
the shaped article having a curved shape,
the hardcoat layer defining an outermost surface of the shaped article,
the hardcoat layer comprising
a cured product of a curable composition,
the curable composition comprising:
a cationically curable silicone resin; and
a leveling agent,
the cationically curable silicone resin comprising
a silsesquioxane unit,
the cationically curable silicone resin comprising an epoxy-containing monomeric unit in a proportion of 50 mole percent or more of a totality of all monomeric units,
the cationically curable silicone resin having a number-average molecular weight of 1000 to 3000,
the cationically curable silicone resin comprising a constitutional unit represented by Formula (1) as the silsesquioxane unit,
the constitutional unit represented by Formula (1) being present in a proportion of 50 mole percent or more of a totality (100 mole percent) of all siloxane constitutional units, where Formula (1) is expressed as follows:

$$[R^1SiO_{3/2}] \quad (1)$$

wherein $R^1$ is selected from an epoxy-containing group, hydrogen, and a hydrocarbon group,
the cationically curable silicone resin further comprising a constitutional unit represented by Formula (2) as the silsesquioxane unit, and
the cationically curable silicone resin having a mole ratio of the constitutional unit represented by Formula (1) to the constitutional unit represented by Formula (2) of 5 to 18, where Formula (2) is expressed as follows:

$$[R^1SiO_{2/2}(OR^2)] \quad (2)$$

wherein $R^1$ is as defined in Formula (1); and $R^2$ is selected from hydrogen and $C_1$-$C_4$ alkyl.
2. The shaped article according to claim 1,
wherein the cationically curable silicone resin has a total proportion (totality) of the constitutional unit represented by Formula (1) and the constitutional unit represented by Formula (2) of 55 to 100 mole percent of the totality (100 mole percent) of all siloxane constitutional units.
3. The shaped article according to claim 1 or 2,
wherein the cationically curable silicone resin has a molecular-weight dispersity (weight-average molecular weight to number-average molecular weight ratio) of 1.0 to 3.0.
4. The shaped article according to claim 1,
wherein $R^1$ in Formula (1) comprises at least one of groups represented by Formulae (1a) to (1d):

(1a)

wherein $R^{1a}$ represents linear or branched alkylene,

(1b)

wherein $R^{1b}$ represents linear or branched alkylene,

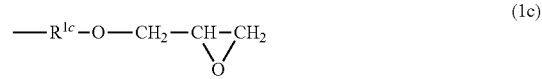
(1c)

wherein $R^{1c}$ represents linear or branched alkylene,

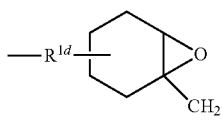
(1d)

wherein $R^{1d}$ represents linear or branched alkylene.

5. The shaped article according to claim 1,
wherein the leveling agent is at least one of a silicone leveling agent and a fluorine leveling agent, and
wherein the leveling agent contains at least one of an epoxy-reactive group and a hydrolytically condensable group.

6. The shaped article according to claim 1,
wherein the curable composition comprises the leveling agent in a proportion of 0.01 to 10 parts by weight per 100 parts by weight of the cationically curable silicone resin.

7. The shaped article according to claim 1,
wherein the leveling agent is a hydroxy-containing silicone leveling agent, and
wherein the curable composition comprises the leveling agent in a proportion of 0.01 to 5 parts by weight per 100 parts by weight of the cationically curable silicone resin.

8. The shaped article according to claim 1, further comprising
a curing catalyst.

9. The shaped article according to claim 8,
wherein the curing catalyst is a cationic photoinitiator.

10. The shaped article according to claim 8,
wherein the curing catalyst is a cationic thermal initiator.

11. The shaped article according to claim 1,
wherein the curable composition is a curable composition for hardcoat layer formation.

12. The shaped article according to claim 1,
wherein the hardcoat layer has a thickness of 0.1 to 200 µm.

13. The shaped article according to claim 1,
wherein the shaped article is produced through a roll-to-roll process.

* * * * *